(12) United States Patent
Vaughey et al.

(10) Patent No.: US 11,145,905 B2
(45) Date of Patent: Oct. 12, 2021

(54) ELECTROLYTE COMPOSITIONS FOR STABILIZING SILICON ELECTRODES IN LITHIUM BATTERIES

(71) Applicant: UCHICAGO ARGONNE, LLC, Chicago, IL (US)

(72) Inventors: John T. Vaughey, Elmhurst, IL (US); Binghong Han, Westmont, IL (US); Baris Key, Lisle, IL (US); Fulya Dogan Key, Lisle, IL (US); Chen Liao, Westmont, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 237 days.

(21) Appl. No.: 16/375,431

(22) Filed: Apr. 4, 2019

(65) Prior Publication Data

US 2020/0321655 A1     Oct. 8, 2020

(51) Int. Cl.
*H01M 10/0568*     (2010.01)
*H01M 10/0569*     (2010.01)
(Continued)

(52) U.S. Cl.
CPC ....... *H01M 10/0568* (2013.01); *H01M 4/386* (2013.01); *H01M 10/0525* (2013.01);
(Continued)

(58) Field of Classification Search
CPC ......... H01M 10/0568; H01M 10/0525; H01M 10/0569; H01M 2004/027; H01M 2300/0025; H01M 4/386
See application file for complete search history.

(56) References Cited

U.S. PATENT DOCUMENTS 10,003,068 B2   6/2018  Lopez et al.
2015/0086877 A1* 3/2015  Yamazaki ............ C07D 317/36
                                                          429/332
(Continued)

FOREIGN PATENT DOCUMENTS

WO     2013/165767 A1   11/2013

OTHER PUBLICATIONS

Abe, K., T.R Jow et al. (eds.), Electrolytes For Lithium and Lithium-Ion Batteries, Non-Aqueous Electrolytes and Advances in Additives, Chapter 3, 167-182 (2014).
(Continued)

*Primary Examiner* — Jimmy Vo
(74) *Attorney, Agent, or Firm* — Olson & Cepuritis, Ltd.

(57) ABSTRACT

A lithium-ion electrochemical cell comprises a first electrode, a second electrode comprising elemental silicon, a microporous separator membrane between the first and second electrodes, and an electrolyte in contact with the electrodes and the membrane. The electrolyte comprises a lithium salt at a concentration in the range of about 0.1 M to about 5 M, and an additional metal salt at a concentration in the range of about 0.001 to about 5 M dissolved in an organic solvent. The additional metal salt comprises a metal cation that can form a lithium-silicon-metal Zintl phase; and the first electrode comprises metallic lithium or a cathode active material capable of donating and accepting lithium ions to and from the second electrode during electrochemical cycling. Electrolytes for use with silicon-containing electrodes also are described.

16 Claims, 21 Drawing Sheets

(51) Int. Cl.
    *H01M 10/0525*   (2010.01)
    *H01M 4/38*      (2006.01)
    *H01M 4/02*      (2006.01)
(52) U.S. Cl.
    CPC .. *H01M 10/0569* (2013.01); *H01M 2004/027* (2013.01); *H01M 2300/0025* (2013.01)

(56) References Cited

U.S. PATENT DOCUMENTS

| 2016/0087306 A1* | 3/2016 | Lee | H01M 10/0525 |
| | | | 429/317 |
| 2016/0226104 A1* | 8/2016 | Teran | H01M 10/4235 |
| 2016/0254567 A1* | 9/2016 | Cai | H01M 10/0564 |
| | | | 429/306 |

OTHER PUBLICATIONS

Arora, P. et al., Battery Separators, Chemical Review 104, 4419-4462 (2004).
Burrell, A. et al., Silicon Electrolyte Interface Stabilization (SEISta), Second Quarter Progress Report 1-44 (2018).
Li, Q. et al., Progress In Electrolytes For Rechargeable Li-Based Batteries and Beyond, Science Direct, Green Energy & Environment, 1-25 (2016).
Korbe, S. et al., Chemistry of the Carba-closo-dodecaborate(-) Anion CB11H12-, Chemical Review 106, 5208-5249 (2006).
Wu, James J. et al., Fundamental Investigation of Si Anode in Li-Ion Cells, NASA, gov., 1-5 (2019).

* cited by examiner

ELECTROLYTE COMPOSITIONS FOR STABILIZING SILICON ELECTRODES IN LITHIUM BATTERIES

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

This invention relates to lithium electrochemical cells and batteries with silicon-based electrodes. In particular this application relates electrolyte compositions that improve performance and stability of silicon-based electrodes in lithium battery systems.

BACKGROUND

The rapid development of electric vehicles (EVs), plug-in hybrid electric vehicles (HEVs), and portable electronic devices has created a high demand for a next-generation of lithium-ion batteries with higher specific capacities and higher efficiencies. While significant effort has been placed on identifying and creating new cathode materials, advances in anode development have been identified by modeling as a more direct pathway to increase the energy density of a full electrochemical cell. The commercial anode materials currently used, notably graphite, have excellent stability and properties, however, their relatively low capacity has become a limiting factor in the next-generation cell development. With this realization, partially or fully replacing the traditional graphite anode by silicon has been an area of interest for several years, since silicon is abundant, low-cost, and has a theoretical capacity (about 3640 mAh/g) approximately 10 times higher than graphite (about 370 mAh/g).

In practice, the beneficial attributes of Si are offset by issues associated with the large volume expansion that occurs with the reversible formation of various lithium silicides (LS) and the reactivity of the lithiated Si electrode with highly charged $Si_2^{-2}$ and/or $Si^{-4}$ anions, which reduce the binders and electrolyte components. Together these processes combine to reduce the amount of active lithium, reduce free electrolyte solvents, break binder-surface interactions, and contaminate interfacial surfaces with various impurity phases, resulting in very low cycling efficiencies and an unstable solid electrolyte interphase (SEI). One of the main reported ways to stabilize Si anodes has been to use anode binders that are more compatible and flexible than the polyvinylidene difluoride (PVDF) binders traditionally used with graphite anodes, for example, using carboxymethylcellulose (CMC), polyacrylic acid (PAA), or lithiated PAA (LiPAA) as a binder in place of PVDF.

Electrolyte additives that form more stable and elastic SEI than the traditional electrolyte-based SEI layers also have been investigated in an effort to identify components whose polymeric form withstands the great volume changes that occur during charging and discharging of Si anodes. Such additives include the now commonly used fluoroethylene carbonate (FEC), as well as materials adapted from graphite-based lithium-ion systems including vinylene carbonate (VC), lithium bisoxalatoborate (LiBOB), succinic anhydride (SA), and methylene-ethylene carbonate (MEC). Attempts also have been made to modify morphology, nanostructure, and composite material composition, to relieve material strain and reduce SEI degradation during cycling. None of these approaches has been particularly successful in actual battery systems.

Materials comprising Si in combination with a metal other than lithium, e.g., Si compounds, intermetallics, or Zintl phases (i.e., the product of a reaction between an alkali metal or alkaline earth metal with a post-transition metal or metalloid, such as Si), have been evaluated as anodes, per se, for lithium-ion batteries, as well. Such materials have met with limited success, however, because of, e.g., slow Li-ion transport, extrusion of the other metal, unfavorable phase transformations during lithiation/delithiation processes, or poor cycling capacities due to the high content of inactive metals in the anode materials.

In view of the foregoing problems with Si-containing anodes in lithium-ion batteries, there is an ongoing need for improvements in lithium battery systems utilizing silicon anodes. The electrolytes, electrochemical cells, and batteries described herein address this need.

SUMMARY

Partially or fully replacing a traditional graphite (C) anode by a silicon (Si) anode can greatly improve the energy density of lithium-ion batteries. However, during charging, Si undergoes a large volume expansion as lithium intercalates into the silicon and highly reactive lithium silicides form, resulting in continuous consumption of lithium and of electrolyte, as well as fast decay of the anode. A lithium-ion electrochemical cell described herein comprises a first electrode, a second electrode comprising elemental silicon in any form and concentration (e.g., as silicon nanoparticles or silicon nanoparticles blended with conductive carbon in a binding matrix), a microporous separator membrane between the first and second electrodes, and a lithium electrolyte in contact with the first electrode, the second electrode, and the membrane.

The electrolyte typically comprises a lithium salt at a concentration in the range of about 0.1 M to about 5 M and an additional metal salt at a concentration in the range of about 0.001 M to about 5 M, both dissolved in an organic solvent (e.g., organic carbonates, glymes, etc.). The additional metal salt comprises a magnesium salt, an aluminum salt, a calcium salt, a salt of another cation that can form Zintl phases with Li and Si (e.g., Zn, Ni, Pd, Cu, K, Na, Zr, Nd, Pt, Ag, Ir, Ba, Sr, Eu, Rh, B, La, Ge, Y, In, Au, Ce, Ga), or a combination of two or more thereof (e.g., a mixture of magnesium salt and calcium salt).

In some embodiments, the first electrode comprises metallic lithium, which in conjunction with the second (Si-containing) electrode forms what is commonly called a "half-cell" configuration, In such half-cells, the additional salt preferably comprises a magnesium salt, a calcium salt, an aluminum salt, a zinc salt, or a combination of two of more of said salts.

In other embodiments, the second electrode acts as an anode, and the first electrode is a cathode comprising a cathode active material capable of donating and accepting lithium ions to and from the anode during electrochemical charging and discharging, respectively, which is commonly referred to as a "full-cell" configuration. The cathode active material typically is a metal containing salt or oxide material, such as a lithium-transition metal oxide (e.g., layered and spinel lithium metal oxides where the metal comprises, e.g., Mn, Ni, Co or a combination of two or more thereof), a lithium-metal phosphate (e.g., lithium iron phosphate), a metal sulfide (e.g., iron sulfide), and the like, which has a structure that can accommodate lithium from the anode during discharging of the cell, and that can donate the lithium to the anode during charging of the cell.

In some embodiments, the electrolyte comprises fluoroethylene carbonate (FEC), vinylene carbonate (VC), or another additive(s) for improving battery performance.

As described herein, the addition of a relatively low concentration (e.g., about 0.1 to about 0.2 M) of a soluble salt additive to the non-aqueous lithium electrolyte of a lithium-ion battery provides surprising stabilization of silicon-containing anodes during electrochemical cycling. Salt additives comprising Mg, Al, Ca, Zn, and/or other metal cations in which the metal can form a Zintl phase with silicon and lithium, stabilize the Si-anode chemistry through in situ formation of Li-M-Si ternary phases during the charging process, leading to improved properties relative to lithium batteries with silicon-based anodes lacking the additive salt(s).

Preferably, the organic solvent of the electrolyte does not include ethylene carbonate, because of the highly reactive nature of ethylene carbonate with the lithiated silicon. Preferred solvents include glymes (e.g., triglyme), and/or carbonates other than ethylene carbonate, optionally in combination with FEC; such solvents provide additional unexpected benefits, such as less electrolyte-LS interactions, accompanied by higher initial capacities compared to commonly used ethylene carbonate-containing solvents.

The following non-limiting embodiments illustrate certain aspects and features of the electrochemical cells, electrolytes and batteries described here.

Embodiment 1 is a lithium-ion electrochemical cell comprising: (a) a first electrode; (b) a second electrode comprising of any form and concentration of elemental silicon irrespective of surface coating; (c) a microporous separator membrane between the first and second electrodes; and (d) an electrolyte in contact with the electrodes and the membrane; the electrolyte comprising a lithium salt at a concentration in the range of about 0.1 M to about 5 M, and an additional metal salt at a concentration in the range of about 0.001 to about 5 M, dissolved in an organic solvent; and the first electrode comprises metallic lithium or a cathode active material capable of donating and accepting lithium ions to and from the second electrode during electrochemical cycling. The additional metal salt is selected from the group consisting of a magnesium salt, an aluminum salt, a calcium salt, a zinc salt, a salt comprising another metal cation that can form a Zintl phase with Li and Si, and a combination of two or more such salts; with the proviso that the selected additional metal salt does not react with the cathode active material when present in the first electrode. For example, when the first electrode comprises a zinc salt, the first electrode can comprise metallic lithium, but not a cathode active material such as NMC532 ($LiNi_{0.5}Mn_{0.3}Co_{0.2}O_2$) or Li-rich HE5050 ($Li_{1.2}Ni_{0.2}Co_{0.2}Mn_{0.6}O_2$), which react unfavorably with Zn cation, as described elsewhere herein.

Embodiment 2 comprises the electrochemical cell of embodiment 1, wherein the additional metal salt comprises a cation selected from the group consisting of $Mg^{2+}$, $Al^{3+}$, $Zn^{2+}$, $Sr^{2+}$, $Sc^{3+}$, $Y^{3+}$, $Ga^{3+}$ or another cation that can form Zintl phases with Li and Si, and a combination of two or more such cations; and anions selected from the group consisting of bis(trifluoromethanesulfonyl)imidate ($TFSI^-$), 2-trifluoromethyl-4,5-dicyanoimidazolate ($TDI^-$), 4,5-dicyano-1,2,3-triazolate ($DCTA^-$), trifluoromethanesulfonate ($Tf^-$), perchlorate ($ClO_4^-$), bis(oxalato)borate ($BOB^-$), difluoro(oxalato)borate ($DFOB^-$), tetrafluoroborate ($BF_4^-$), hexafluorophosphate ($PF_6^-$), thiocyanate ($SCN^-$), bis(fluorosulfonyl)imidate ($FSI^-$), bis(pentafluoroethylsulfonyl)imidate (BETI), tetracyanoborate ($B(CN)_4^-$), hexafluoroarsenate ($AsF_6^-$), nitrate, triflate ($OTf^-$), dicyanamide [$N(CN)_2^-$], methylsulfate ($MeSO_4^-$), dimethylphosphate ($Me_2PO_4^-$), acetate ($MeCO_2^-$), chloride ($Cl^-$), bromide ($Br^-$), iodide ($I^-$), tetrakis(3,5-bis(trifluoromethyl)phenyl)borate ($BArF^-$), carba-closo-dodecaborate ($CB_{11}H_{12}^-$), a substituted carba-closo-dodecaborate of formula $CB_{11}YX_{11}^-$(wherein X and Y are selected from halogen and hydrogen), and a combination of two or more thereof.

Embodiment 3 comprises the electrochemical cell of embodiment 1 or 2, wherein the additional metal salt comprises $Mg(TFSI)_2$, $Al(TFSI)_3$, $Ca(TFSI)_2$, $Zn(TFSI)$, or a combination of two or more thereof (such as $Mg(TFSI)_2$+ $Ca(TFSI)_2$).

Embodiment 4 comprises the electrochemical cell of any one of embodiments 1 to 3, wherein the non-aqueous solvent of the electrolyte comprises one or more material selected from the group consisting of an ether, a linear carbonate, a cyclic carbonate, an ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone or any other solvent.

Embodiment 5 comprises the electrochemical cell of any one of embodiments 1 to 4, wherein the non-aqueous solvent of the electrolyte comprises (a) an ether selected from the group consisting of glyme, diglyme, triglyme, and tetraglyme; (b) an organic carbonate other than ethylene carbonate; or (c) a combination of (a) and (b).

Embodiment 6 comprises the electrochemical cell of any one of embodiments 1 to 5, wherein the non-aqueous solvent of the electrolyte comprises triglyme.

Embodiment 7 comprises the electrochemical cell of any one of embodiments 1 to 6, wherein the non-aqueous solvent of the electrolyte comprises one or more carbonate esters selected from the group consisting of propylene carbonate, dimethyl carbonate, diethyl carbonate, and ethyl methyl carbonate.

Embodiment 8 comprises the electrochemical cell of any one of embodiments 1 to 7, wherein the lithium salt of the electrolyte comprises one or more salt selected from the group consisting of lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiTDI), lithium trifluoromethanesulfonate (LiTf), lithium perchlorate ($LiClO_4$), lithium bis(oxalato)borate (LiBOB), lithium difluoro(oxalato)borate (LiDFOB), lithium tetrafluoroborate ($LiBF_4$), lithium hexafluorophosphate ($LiPF_6$), lithium thiocyanate (LiSCN), lithium bis(fluorosulfonyl)imidate (LIFSI), lithium bis(pentafluoroethylsulfonyl)imidate (LBETI), lithium tetracyanoborate ($LiB(CN)_4$), lithium hexafluroroarsenate ($LiAsF_6$), lithium nitrate, and a combinations of two or more thereof.

Embodiment 9 comprises the electrochemical cell of any one of embodiments 1 to 8, wherein the lithium salt of the electrolyte comprises $LiPF_6$.

Embodiment 10 comprises the electrochemical cell of any one of embodiments 1 to 9, wherein the silicon of the second electrode comprises silicon particles, a silicon film, or a combination thereof.

Embodiment 11 comprises the electrochemical cell of any one of embodiments 1 to 10, wherein the second electrode is graphite-free.

Embodiment 12 comprises the electrochemical cell of any one of embodiments 1 to 10, wherein the second electrode comprises silicon in combination with a tetrel element (Sn, Ge, etc.), a pnictogen element (Sb, As, etc.), or a tetrel element and a pnictogen element.

Embodiment 13 comprises the electrochemical cell of any one of embodiments 1 to 10, wherein the second electrode comprises silicon and one or more type of carbon material (e.g., carbon black, graphite, and the like).

Embodiment 14 comprises the electrochemical cell of any one of embodiments 1 to 13, wherein the first electrode comprises a cathode active material selected from the group consisting of a layered lithium metal oxide, a layered lithium aluminum metal oxide, a lithium and manganese rich metal oxide, a spinel lithium metal oxide; a structurally integrated 'layered-layered' (LL) lithium metal oxide; a structurally integrated 'layered-spinel' (LS) lithium metal oxide, and a combination of two or more thereof.

Embodiment 15 comprises the electrochemical cell of any one of embodiments 1 to 14, wherein the electrolyte further comprises fluoroethylene carbonate (FEC) at a concentration in the range of about 0.001 to about 12 M.

Embodiment 16 is an electrolyte for a lithium electrochemical cell with a silicon electrode; the electrolyte comprising: a lithium salt at a concentration in the range of about 0.1 M to about 5 M and an additional metal salt at a concentration in the range of about 0.001 to about 5 M, dissolved in an organic solvent; wherein the additional metal salt comprises a magnesium salt, an aluminum salt, a calcium salt, a zinc salt, a salt or another cation that can form Zintl phases with Li and Si or a combination of two or more such salts (e.g., a magnesium and calcium salt mixture).

Embodiment 17 comprises the electrolyte of embodiment 16, wherein the additional metal salt comprises an anion selected from the group consisting of bis(trifluoromethanesulfonyl)imidate (TMSI), 2-trifluoromethyl-4,5-dicyanoimidazolate (TDI), 4,5-dicyano-1,2,3-triazolate (DCTA), trifluoromethanesulfonate (Tf), perchlorate ($ClO_4^-$), bis(oxalato)borate (BOB), difluoro(oxalato)borate (DFOB), tetrafluoroborate ($BF_4^-$), hexafluorophosphate ($PF_6^-$), thiocyanate ($SCN^-$), bis(fluorosulfonyl)imidate (FSI), bis(pentafluoroethylsulfonyl)imidate (BETI), tetracyanoborate ($B(CN)_4^-$), hexafluoroarsenate ($AsF_6^-$), nitrate, triflate ($OTf^-$), dicyanamide ($N(CN)_2^-$), methylsulfate ($MeSO_4^-$), dimethylphosphate ($Me_2PO_4^-$), acetate ($MeCO_2^-$), chloride ($Cl^-$), bromide ($Br^-$), iodide ($I^-$), tetrakis(3,5-bis(trifluoromethyl)phenyl)borate ($BArF^-$), carba-closo-dodecaborate ($CB_{11}H_{12}^-$), a substituted carba-closo-dodecaborate of formula $CB_{11}YX_{11}^-$ (wherein X and Y are selected from halogen and hydrogen), and a combination of two or more thereof.

Embodiment 18 comprises the electrolyte of embodiment 16 or 17, wherein the additional metal salt comprises $Mg(TFSI)_2$, $Al(TFSI)_3$, $Ca(TFSI)_2$, $Zn(TFSI)_2$, or a combination of two or more thereof (such as $Mg(TFSI)_2$+$Ca(TFSI)_2$).

Embodiment 19 comprises the electrolyte of any one of embodiments 16 to 18, wherein the non-aqueous solvent comprises one or more material selected from the group consisting of an ether, a linear carbonate, a cyclic carbonate, an ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone.

Embodiment 20 comprises the electrolyte of any one of embodiments 16 to 19, wherein the non-aqueous solvent comprises a glyme (e.g., triglyme), an organic carbonate other than ethylene carbonate, or a combination thereof.

Embodiment 21 comprises the electrolyte of any one of embodiments 16 to 20, wherein the lithium salt comprises one or more salts selected from the group consisting of lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiTDI), lithium trifluoromethanesulfonate (LiTf), lithium perchlorate ($LiClO_4$), lithium bis(oxalato)borate (LiBOB), lithium difluoro(oxalato)borate (LiDFOB), lithium tetrafluoroborate ($LiBF_4$), lithium hexafluorophosphate ($LiPF_6$), lithium thiocyanate (LiSCN), lithium bis(fluorosulfonyl)imidate (LIFSI), lithium bis(pentafluoroethylsulfonyl)imidate (LBETI), lithium tetracyanoborate ($LiB(CN)_4$), lithium hexafluroroarsenate ($LiAsF_6$), lithium nitrate, or a combination of two or more thereof.

Embodiment 22 comprises the electrolyte of any one of embodiments 16 to 21, wherein the lithium salt comprises $LiPF_6$.

Embodiment 23 comprises the electrolyte of any one of embodiments 16 to 22, further comprising fluoroethylene carbonate (FEC) at a concentration in the range of 0.001 to about 12 M.

Embodiment 24 is a battery comprising a plurality of electrochemical cells of any one of embodiments 1 to 15 electrically connected together in series, in parallel, or in both series and parallel.

Lithium silicides and magnesium lithium silicides were utilized as model compounds to investigate the influence of metal doping on the reactivity of lithiated Si. Mg doping dramatically suppresses the chemical reactions between the lithium silicide compounds and common electrolyte solvents. New mixed-salt electrolytes were prepared containing a Mg, Al, Ca or Zn salt (i.e., $M(TFSI)_x$ (wherein M=Mg, Zn, Ca and x=2, or M=Al, x=3) as an additive to the primary electrolyte salt ($LiPF_6$) and tested in commercially relevant Si electrodes, which achieved higher capacity, superior cyclability, and higher coulombic efficiencies in both half-cell and full-cell configurations (except for M=Zn) when compared with standard electrolytes. Post-electrochemistry characterizations demonstrated that the additive resulted in co-insertion of M metal cations along with Li into Si during the lithiation process, thus stabilizing silicon anions by forming more stable Li-M-Si ternary phases. Surprisingly, these ternary phases fundamentally change the traditional Li—Si binary chemistry of the silicon anode, while minimally affecting silicon electrochemical profiles and theoretical capacities. Full-cell tests confirmed that electrolytes comprising Mg, Al and Ca salt additives, as well as mixtures of Mg and Ca salt additives, afford significant improvements in Si-containing electrode stability. Thus, the electrolytes, electrochemical cells, and batteries described herein provide new and simple ways to stabilize Si-containing anodes, and thereby enable more widespread application of Si-containing anodes for lithium-ion batteries.

DETAILED DESCRIPTION

Figure 1:
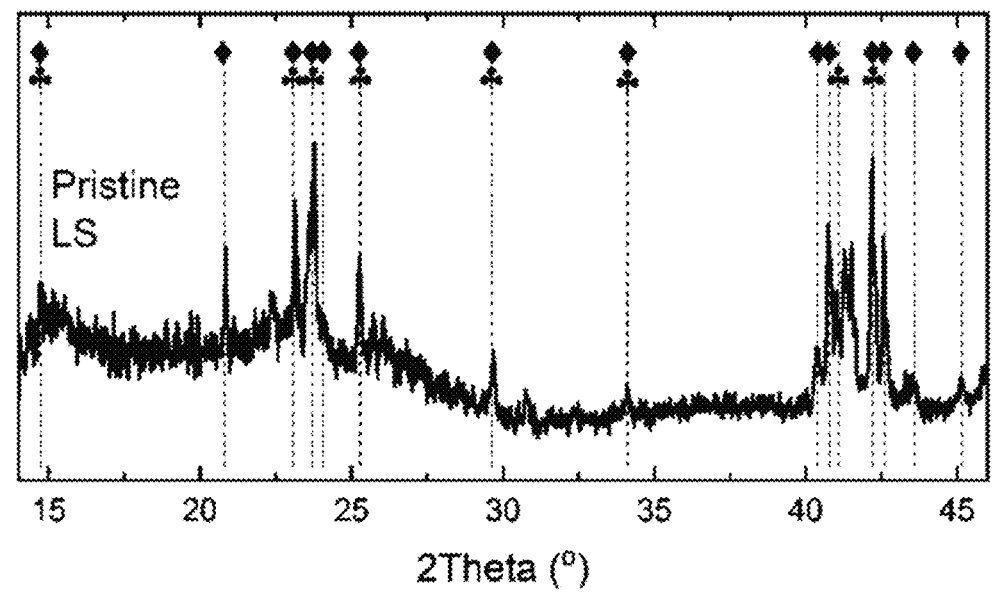
FIG. 1 provides XRD results and SEM images of pristine (a) LS and (b) MLS powders. The XRD reference peak positions marked by clubs and diamonds in panel (a) represent the $Li_7Si_3$ and $Li_{12}Si_7$ phases, respectively. The XRD reference peak positions marked by hearts and spades in panel (b) represent the $Li_2MgSi$ and $Li_8MgSi_6$ phases, respectively.
Figure 1:
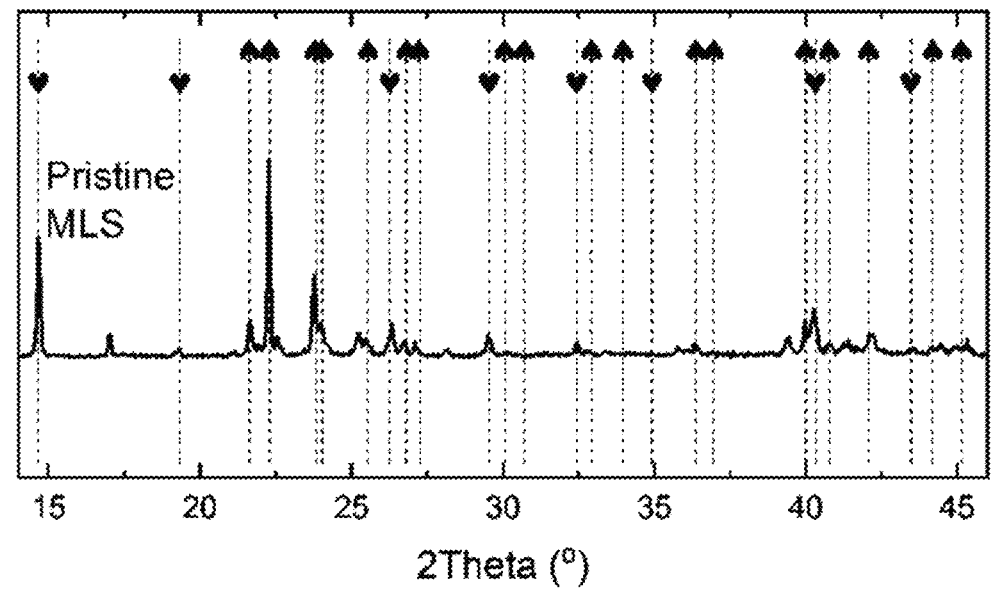

As described herein, lithium electrolytes comprising an added metal (M) salt, e.g., a Mg, Al, Ca, Sr, Sc, Y, Ga, salt or mixtures of such salts (at a concentration of about 0.001 to about 5 M), promote in situ formation of amorphous Li-M-Si ternary phases in silicon anodes during the charging process. The metal, M, is selected so to avoid anodic or cathodic activity other than insertion into Si to form ternary Zintl phases. These ternary phases, presumably forming initially on the surface of the anode particles, protect the underlying lithiated Si phases, reduce side reactions with the electrolyte, and limit the effect of large volume changes by reacting with freshly exposed surfaces.

Preferably, the silicon component of the anode comprises a silicon film, or silicon particles in a binding matrix. Such Si particles have little surface oxidation. Preferably, the binding matrix for the silicon particles comprises a lithium polyacrylic acid (LiPAA) binder.

Lithium silicides (LS) and Mg-doped lithium silicides (MLS) were used as model systems for initial evaluation of metal salt effects on Si anodes, to investigate the presence M on the reactivity of lithiated Si in contact with electrolyte solvents. Using solid-state magic angle spinning nuclear magnetic resonance (MAS-NMR) spectroscopy it was evident that controlled Mg doping dramatically suppressed reactions between the model compounds and common electrolyte solvents (i.e. ethylene carbonate (EC) and ethyl methyl carbonate (EMC)). The stabilization of highly reactive lithiated-Si phases with this new approach is evident from electrochemical tests on standard commercially relevant electrode structures. As examples, $Mg(TFSI)_2$, $Zn(TFSI)_2$, $Ca(TFSI)_2$, $Al(TFSI)_3$, or their mixture were added into the $LiPF_6$-based Gen2 electrolyte to demonstrate how the adding of these additional salts as additives would improve the electrochemical performance of half cells and full cells with Si-containing electrodes, likely due to the stabilization of the lithiated Si electrode. Surprisingly, the electrodes evaluated in half cells using mixed salt electrolytes containing $Mg(TFSI)_2$, $Zn(TFSI)_2$, $Ca(TFSI)_2$, $Al(TFSI)_3$, or their mixture as an additive to a $LiPF_6$-based electrolyte showed higher capacities and superior cyclabilities with significantly improved coulombic efficiencies when compared to standard electrolyte systems. These results were mirrored in full cells for Mg, Ca, and Al salts.

Post electrochemical NMR, X-ray diffraction (XRD), transmission electron microscopy (TEM), and energy dispersive spectrometry (EDS) characterization experiments demonstrated that adding Mg salts promotes the doping of a small concentration of Mg into Si during the lithiation process to form relatively more stable amorphous Li-M-Si ternaries, which fundamentally change the traditional Li—Si binary chemistry while minimally affecting the electrochemical profiles and capacities. Using Mg, Zn or Al cations in the electrolyte (at a concentration of about 0.001 to about 5 M) helps to avoid the complete formation of crystalline Li-M-Si ternaries except at the end of lithiation or M—Si binaries, effectively avoiding any major M extrusion or unfavorable long range binary-ternary phase transformations without an apparent decrease in Li transport properties in the new bulk and interfacial phases.

The salt additives can include any desired anion that is compatible with a lithium electrochemical cell during electrochemical cycling (i.e., charging and discharging). Non-limiting examples of counter anions for the metal salts include bis(trifluoromethanesulfonyl)imidate (TFSI$^-$), 2-trifluoromethyl-4,5-dicyanoimidazolate (TDI$^-$), 4,5-dicyano-1,2,3-triazolate (DCTA$^-$), trifluoromethanesulfonate (Tf$^-$), perchlorate (ClO$_4^-$), bis(oxalato)borate (BOB$^-$), difluoro (oxalato)borate (DFOB$^-$), tetrafluoroborate (BF$_4^-$), hexafluorophosphate (PF$_6^-$), thiocyanate (SCN$^-$), bis(fluorosulfonyl)imidate (FSI$^-$), bis(pentafluoroethylsulfonyl) imidate (BETI), tetracyanoborate (B(CN)$_4^-$), hexafluoroarsenate (AsF$_6^-$), nitrate, triflate (OTf$^-$), dicyanamide [N(CN)$_2^-$], methylsulfate (MeSO$_4^-$), dimethylphosphate (Me$_2$PO$_4$), acetate (MeCO$_2^-$), chloride (Cl$^-$), bromide (Br$^-$), iodide (I$^-$), tetrakis(3,5-bis(trifluoromethyl)phenyl)borate (BArF$^-$), carba-closo-dodecaborate (CB$_{11}$H$_{12}^-$), a substituted carba-closo-dodecaborate of formula CB$_{11}$YX$_{11}^-$ (wherein X and Y are selected from halogen and hydrogen), a combination of two or more thereof, and the like. In some preferred embodiments, the lithium salt comprises Mg(TFSI)$_2$ or Al(TFSI)$_3$.

The electrolytes described herein comprise an electrolyte salt dissolved in any non-aqueous organic solvent that can be utilized in a lithium electrochemical cell. Non-limiting examples of such solvents include, e.g., one or more solvent selected from an ether, an ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme, diglyme or triglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate (e.g., FEC), a fluoro-substituted sulfolane, and a fluoro-substituted sulfone. The solvent can comprise a single solvent compound or a mixture of two or more solvent compounds. Preferred solvents include, e.g., oxyethylene ethers (e.g., glyme, diglyme, triglyme and tetraglyme), organic carbonates (e.g., any organic carbonate, preferably other than ethylene carbonate, such as EMC), or mixtures thereof.

The salt additives can include any desired lithium salt that is compatible with a lithium electrochemical cell during electrochemical cycling (i.e., charging and discharging). Non-limiting examples of primary lithium salts useful in the electrolyte compositions described herein include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiBOB), lithium difluoro (oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium hexafluoroarsenate (LiAsF$_6$), lithium nitrate, combinations of two or more thereof, and the like. In some preferred embodiments, the lithium salt is LiPF$_6$. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between a Si anode and a cathode, and includes so-called full cells with a Si anode material, as well as so-called half-cells. In some embodiments, the lithium salt is present in the electrolyte at a concentration in the range of about 0.1 M to about 3 M, e.g., about 0.5 M to 2 M, or 1 M to 1.5M.

The electrolyte compositions described herein also can optionally comprise an additional additive such as those described in Jow et al. (Eds.), *Electrolytes for Lithium and Lithium-ion Batteries*; Chapter 3, pp. 167-182; Springer; New York, N.Y. (2014), which is incorporated herein by reference in its entirety. Such additives can provide, e.g., benefits such as SEI, cathode protection, Li salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additional additive is present in the electrolyte at a concentration in the range of about 0.001 M to about 0.25 M, or about 0.01 M to about 0.1 M. A preferred additional additive is monofluoroethylene carbonate (FEC; also referred to herein as fluoroethylene carbonate), which preferably is utilized at a concentration in the range of 0.001 to about 12M, e.g., about 0.5 to about 2.5 M.

The electrolytes can be incorporated in a lithium-ion electrochemical cell comprising a positive electrode (cathode), a silicon-based negative electrode (anode), and a porous separator between the cathode and anode, with the electrolyte in contact with both the anode and cathode, as is well known in the battery art. A battery can be formed by electrically connecting two or more such electrochemical cells in series, parallel, or a combination of series and parallel. The electrolyte can be utilized with any anode or cathode compositions useful in lithium-ion batteries. Electrochemical cell and battery designs and configurations, anode and cathode materials, as well as electrolyte salts, solvents and other battery or electrode components (e.g., separator membranes, current collectors), which can be used in the electrolytes, cells and batteries described herein, are well known in the lithium battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety. The separator component of the lithium-ion cell can be any separator used in the lithium battery art. A typical material is a porous polyalkylene material such as microporous polypropylene, microporous polyethylene, a microporous propylene-ethylene copolymer, or a combination thereof, e.g., a separator with layers of different polyalkylenes; a poly(vinylidene-difluoride)-polyacrylonitrile graft copolymer microporous separator; and the like. Examples of suitable separators are described in Arora et al., *Chem. Rev.* 2004, 104, 4419-4462, which is incorporated herein by reference in its entirety.

Processes used for manufacturing lithium cells and batteries are well known in the art. The active electrode materials are coated on both sides of metal foil current collectors (typically copper for the anode and aluminum for the cathode) with suitable binders such as polyvinylidene difluoride, or more preferably, a material such as carboxymethylcellulose (CMC), polyacrylic acid (PAA), or lithiated PAA (LiPAA), and the like, to aid in adhering the active materials to the current collectors. LiPAA is a particularly preferred binder for the anodes described herein.

The anode active material comprises elemental silicon (preferably silicon nanoparticles, a silicon film, or both), and in some embodiments the anode is substantially graphite-free. The cathode active material typically is a lithium metal oxide material. Cell assembly typically is carried out on automated equipment. The first stage in the assembly process is to sandwich a separator between the anode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed the cell can be subjected to one of more controlled charge/discharge cycles to activate the electrode materials. This is known as formation cycling. The formation cycling process is well known in the battery art and involves initially charging with a low voltage (e.g., substantially lower that the full-cell voltage) and gradually building up the voltage.

The additive salts described herein can be utilized in any rechargeable lithium battery system with a silicon-based anode and any lithium metal oxide cathode material or other cathode active material used in lithium-ion batteries. In some embodiments, the cathode can comprise a layered lithium metal oxide cathode material such as $LiMO_2$ wherein M=Mn, Ni, Co or a combination thereof (e.g., layered, $LiCoO_2$, a layered lithium nickel-manganese-cobalt oxide, often referred to as "NMC", such as $Ni_{0.5}Mn_{0.3}CO_{0.2}O_2$ (also known as "NMC532"), and similar materials). In other embodiments, the cathode can comprise a spinel lithium metal oxide such as $Li_2M'_2O_4$ wherein M'=Mn, Ni, Co or a combination thereof; a structurally integrated 'layered-layered' (LL) lithium metal oxide such as $xLi_2MnO_3 \cdot (1-x)LiMn_yM_{1-y}O_2$ wherein $0<x<1$, $0 \leq y \leq 1$, M=Ni, Co, or Ni and Co; a structurally integrated 'layered-spinel' (LS) lithium metal oxide such as $xLi_2MnO_3 \cdot (1-x)Li_2Mn_yM_{1-y}O_2$ wherein $0<x<1$, $0 \leq y \leq 2$, M=Ni, Co, or Ni and Co; a structurally integrated 'layered-layered-spinel' (LLS) lithium metal oxide such as $z[xLi_2MnO_3 \cdot Li_2Mn_yM_{2-y}O_4] \cdot (1-z)Li_2M'_2O_4$ wherein $0<x<1$, $0 \leq y \leq 1$, $0<z<1$, M=Ni, Co, or Ni and Co, and M'=Mn, Ni, Co or a combination thereof (e.g., $0.85 \cdot [0.25Li_2MnO_3 \cdot (0.75)LiMn_{0.375}Ni_{0.375}Co_{0.25}O_2] \cdot 0.15Li_2M'_2O_4$ wherein M'=a combination of Mn, Ni, and Co); or any other cathode active material used in lithium-ion batteries.

As used herein, a structurally-integrated composite metal oxide is a material that includes domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite metal oxides are different from and generally have different properties than mere mixtures of two or more metal oxide components (for example, mere mixtures do not share a common oxygen lattice).

The following non-limiting Examples are provided to illustrate certain features and aspects of the compositions and methods described herein.

EX. 1

Material Preparation

LS with a targeted Li:Si ratio of 7:3 was synthesized from a stoichiometric mixture of the Li and Si elements. The mixture was first heated to 750° C. in a covered tantalum (Ta) container, and held at that temperature for about 1 hour (h), then slowly cooled to 700° C. over a period of about 1 h, and then quenched to room temperature. Freshly prepared LS was ground in an agate mortar and pestle for 5 minute (min) in an Ar glovebox (with $O_2$ and $H_2O$ levels below 0.5 ppm) before mixing with different electrolyte solvents. For reference, no physical changes were observed for the mortar and pestle after mixing.

MLS with a target Li:Mg:Si ratio of 2:1:1 was synthesized from a stoichiometric mixture of Li, Mg, and Si elements. The mixture was first heated to 800° C. in a covered Ta container and held at the temperature for about 1 h, then slowly cooled to room temperature. Freshly prepared MLS was ground in an agate mortar and pestle for 5 min in an Ar glovebox (with $O_2$ and $H_2O$ levels below 0.5 ppm) before mixing with different electrolyte solvents.

Triglyme (TG), LiTFSI, $Mg(TFSI)_2$ and $Zn(TFSI)_2$ were purchased from Sigma Aldrich. $Al(TFSI)_3$ was synthesized through the reaction between bis-trifluoromethylsulfonyl imide (i.e., $(CF_3SO_2)_2NH$; HTFSI) and $AlCl_3$ in anhydrous acetonitrile (all ingredients were obtained from Sigma Aldrich). The solvent was evaporated before dried under vacuum at 80° C.

EX. 2

Chemical and Structural Characterizations

MAS-NMR experiments were performed at 7.02 T (300 MHz) on a BRUKER AVANCE III HD spectrometer. NMR spectra were collected at a Larmor frequency of 44.21 MHz at 298K using a 3.2 mm MAS probe. Li spectra were acquired at 10 kHz with a rotor synchronized echo pulse sequence (90°-τ-180°-τ-acq), where $\tau = 1/v_r$. A π/2 pulse width of 2.5 microseconds (µs) was used with a sufficiently long pulse recycle delays of 15 seconds (s). The spectra were referenced to 1 M LiCl aqueous solution at 0 ppm. $^{29}Si$ spectra were acquired at 10 kHz with a single pulse measurement, with sufficiently long pulse recycle delays of 1 s. The spectra were referenced to tetramethylsilane at 0 ppm.

XRD patterns for the pristine and mixture samples were obtained using BRUKER D8 ADVANCE diffractometer equipped with Cu—Kα radiation source (λ=1.5418 Å). The powders were sealed into the sample holders using the X-ray transparent KAPTON tape in the glovebox. The data were processed using BRUKER DIFFRAC.SUITE EVA software.

High-resolution X-ray diffraction (HRXRD) data were collected by synchrotron powder diffraction using beamline 11-BM-B at the Advance Photon Source (APS), Argonne National Laboratory, with an average wavelength of 0.414 Å for all compounds. Samples were loaded in KAPTON capillaries (0.9 mm diameter) and mounted on bases provided by the APS. Two platinum-striped collimating mirrors and a double-crystal Si(111) monochromator were used for the X-ray optics. The data points were collected at room temperature with a step size of 0.001° 2θ and scan speed of 0.01°/s. Data were collected while continually scanning the diffractometer 2θ arm. High resolution and short collection time were obtained by using a unique 12-element Si (111) crystal analyzer/detector. Rietveld refinements were performed using TOPAS 3.0 X-ray analysis software.

Scanning electron microscopy (SEM) studies were performed at 20 kV on a HITACHI S-4700-II microscope in the Center for Nanoscale Materials of Argonne National Laboratory. Pristine LS and MLS powders were directly sprayed onto the carbon tape for imaging.

TEM studies were performed at 200 kV on a JEOL 2100F in the Center for Nanoscale Materials of Argonne National Laboratory, which is equipped with EDS. The images were taken using a GATAN digital micrograph V2.01 (Gatan Inc.). The TEM samples were prepared by washing and sonicating the post-electrochemical-test Si electrode in dimethyl carbonate (DMC) and then drop cast onto Cu grid in glovebox.

EX. 3

Electrochemical Testing

Coin cells (2032-type) were used to test the electrochemical performance. Several different electrodes were used in this work for half-cell and full-cell tests, which were prepared by Argonne's Cell Analysis, Modeling and Prototyping (CAMP) Facility. Graphite-free high-Si concentration electrodes ("Si electrodes") were prepared by laminating Cu foil as the current collectors with a slurry containing 80 wt % commercial silicon powders from PARACLETE, 10 wt % hard carbon additive (TIMCAL C-NERGY SUPER C45 carbon black additive; "C45 carbon black"), and 10 wt % lithium polyacrylate (LiPAA) silicon compatible binder, mixed in N-methyl 2-Pyrrolidone (NMP). The Si electrodes had a final loading of about 0.96 mg/cm$^2$ and a thickness of about 9 μm (not including the Cu foil). The 15% Si+73% graphite blended electrodes ("15% Si electrodes") were prepared in a similar way on the Cu foil, which contained 15 wt % Si, 73 wt % graphite, 2 wt % C45 carbon black, and 10 wt % LiPAA, with a loading of 3.00 mg/cm$^2$ and a thickness of 27 μm (not including the Cu foil). Lithium nickel-manganese-cobalt (NMC) oxide cathodes (Ni:Mn:Co molar ratio of 5:3:2; "NMC532") were prepared, which comprised 90 wt % LiNi$_{0.5}$Mn$_{0.3}$Co$_{0.2}$O$_2$ from Toda, 5 wt % C45 carbon black, and 5 wt % polyvinylidene difluoride (PVDF) binder on an aluminum foil current collector, with a loading of about 8.98 mg/cm$^2$ and a thickness of about 32 μm (not including the Al foil). Lithium-rich lithium nickel-manganese-cobalt oxide ("Li-rich HE505") cathodes were made of 92 wt % Li$_{1.2}$Ni$_{0.15}$Mn$_{0.55}$Co$_{0.1}$O$_2$ from Toda, 4 wt % C45 carbon black, and 4 wt % PVDF binder, with a loading of about 6.06 mg/cm$^2$ and a thickness of about 26 μm (not including the Al foil). In half-cell tests, the negative electrodes were Li metal chips and the positive electrodes were the Si-containing electrodes, while in the full-cell tests, the negative electrodes were Si or 15% Si anodes with the targeting capacity of about 2 mAh/cm$^2$, and the positive electrodes were NMC532 or Li-rich HE5050 cathodes with the targeting capacity of about 1.6 mAh/cm$^2$. The separators for the cells were CELGARD-2320 trilayer polypropylene-polyethylene-polypropylene membranes (20 μm thickness). Various electrolyte formulations were used, with the compositions listed in Table 1.

The typical half-cell Si-anode testing protocol involves 3 formation cycles, for complete break-in of all crystalline silicon in the electrode, followed by aging cycles for the half cells. The formation cycles consist of a constant current discharge step at a rate of C/20 until 0.01 V lower cutoff voltage was reached, immediately followed by a constant potential (voltage-hold) discharge step at 0.01 V until the current drops below C/50 to ensure full lithiation, where the rate "C" is the current applied to fully charge or discharge the silicon content to the theoretical capacity in one hour. Then the cell is charged to 1.5 V at a rate of C/20 to complete one cycle. After 3 formation cycles, aging cycles begin with similar discharge (with or without voltage hold) and charge steps between 0.01 and 1.5 V, but at a faster rate of C/3.

The typical full-cell testing protocol involves 3 formation cycles followed by hybrid pulse-power capability cycles (HPPC) and aging cycles with voltage holds at 4.1 V followed by HPPC cycles. The formation cycles consist of constant current charge steps at C/20 (with C being the rate to fully charge the Li content of the cell to the theoretical capacity in one hour) until an upper cutoff voltage of 4.1, 4.5, or 4.7 V, immediately followed by a voltage-hold charge step until the current drops below C/50 to ensure full lithiation of the anode. Then the cell is discharged to 3.0 V at a rate of C/20 to complete one cycle. After 3 formation cycles, aging cycles begin with similar charge steps with voltage holds (until C/20 is reached) and discharge steps between 4.1 V and 3.0 V, again with a faster rate of C/3. Hybrid pulse-power capability (HPPC) cycles (not shown in data plots in the drawings) with discharge/charge pulses at the rate of 2C/1.5C for 10 s are used to investigate the impedance change during full-cell electrochemical tests. The HPPC cycles are inserted after 3 formation cycles and after 90 aging cycles. The discharge area specific impedance (ASI) are calculated as ASI=ΔV/ΔI, where ΔV and ΔI are the voltage and current change during the discharge pulse, respectively. For extended-cycling full cell studies up to 270 aging cycles, 2 cells each were resumed to undergo additional aging cycles described above following the second (2nd) HPPC cycle set.

TABLE 1

Formulations and notations of the electrolytes used in this study.

| Electrolyte | Components |
| --- | --- |
| Gen2 | 1.2M LiPF$_6$ in 30 wt % EC + 70 wt % EMC |
| GenF | Gen2 electrolyte +10 wt % FEC |
| GenFM | GenF electrolyte + 0.1M Mg(TFSI)$_2$ |
| GenFZ | GenF electrolyte + 0.1M Zn(TFSI)$_2$ |
| GenFA | GenF electrolyte + 0.1M Al(TFSI)$_3$ |
| GenFC | GenF electrolyte + 0.1M Ca(TFSI)$_2$ |
| GenFMC | GenF electrolyte + 0.05M Mg(TFSI)$_2$ + 0.05M Ca(TFSI)$_2$ |
| TGLiF | 1M LiTFSI in 90 wt % TG + 10 wt % FEC |
| TGLiFM | TGLiF + 0.1M Mg(TFSI)$_2$ |

EX. 4

Structural Evaluations with Model Compositions

Previously, researchers have found that substituting Mg, Zn, and Al into a lithium-rich LS Zintl phase will significantly improve its thermodynamic stability; however, the effect of metal substitutions on the chemical stability of these reduced compounds in contact with electrolytes has not been reported. As described herein, synthesized crystalline MLS and LS compounds were utilized as model compounds to assess how well metal, M, substitution into charged silicon anodes will reduce deleterious interactions with the electrolyte solvents. The SEM images and XRD patterns of the pristine lithium silicide (LS) and magnesiated lithium silicide (MLS) model compounds are shown in FIG. 1, which have the target stoichiometry of Li$_7$Si$_3$ and Li$_2$MgSi, respectively. The XRD spectrum of the pristine LS powder in FIG. 1, panel (a), shows that the LS powder also contains Li$_{12}$Si$_7$, a slightly more silicon-rich phase, which results from high temperature lithium evaporation. Similarly, for the pristine MLS powders, the XRD pattern in FIG. 1, panel (b), shows $Li_2MgSi$ and a small amount of $Li_8MgSi_6$ phases. Although the actual lithiated species formed during the charging of Si anodes could be amorphous, previous solid-state NMR studies have shown that the local Li chemical environment in amorphous LS is comparable to those in the crystalline LS. Thus, the LS and MLS compounds are appropriate as a model system to simulate the potential interactions between electrolyte solvents and lithiated Si anodes.

Figure 2:
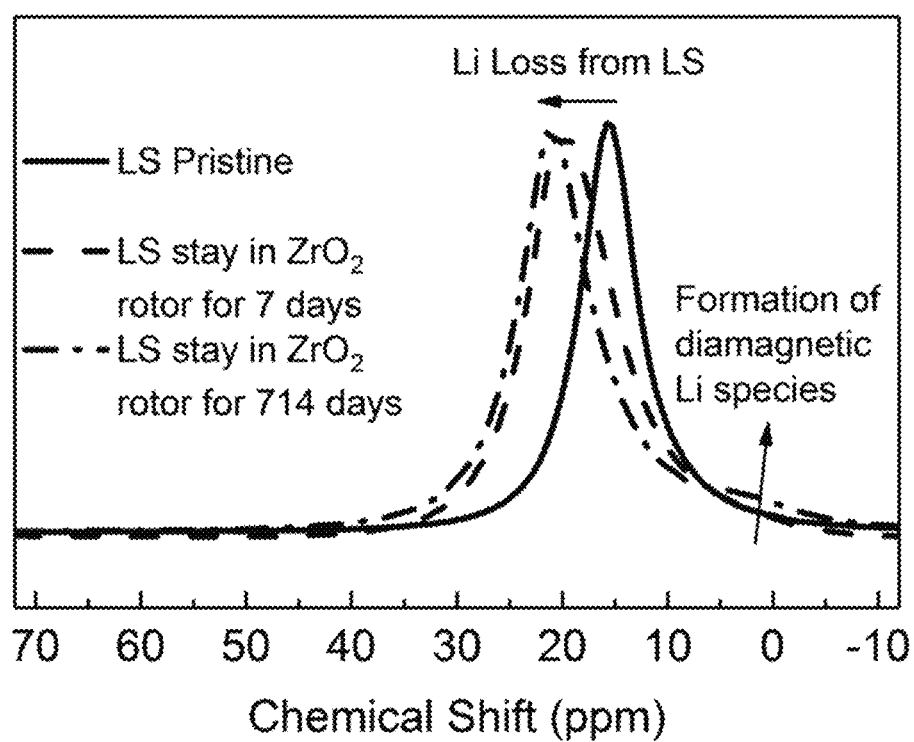
FIG. 2 illustrates $^7Li$ MAS NMR spectra of LS model compounds remaining in sealed $ZrO_2$ NMR rotor. The shift of main Li peak toward higher ppm represents the loss of Li from LS over time. The bump formed around 0 ppm after 14-day holding represents the formation of new diamagnetic Li species, which may be the reaction products between LS and $ZrO_2$.

It is worth noting that the freshly synthesized LS powders are found to be surprisingly reactive after packed and spun in $ZrO_2$ NMR rotors despite the large particle sized observed in SEM, the section of $ZrO_2$, a geologically stable oxide, in directly contact with the fresh powders blackened after an overnight experiment (see FIG. 1, panel (a)). Staying in the $ZrO_2$ rotor for longer time caused the delithiation of pristine LS and finally the formation of a diamagnetic Li phase (see FIG. 2). A similar phenomenon was not observed for powders aged in an Ar-glovebox after several weeks. The NMR rotors were made of $ZrO_2$ and were initially colorless (white). The portion of the rotor directly in contact with LS powders during NMR measurement turned blackish, while the two ends remained white. In comparison, the rotor in contact with fresh MLS powders did not undergo any discoloration after an overnight experiment (see FIG. 1, panel (b)). Considering the reactivity of LS and MLS model compounds, the reactivity experiments done in this study were all measured immediately after mixing the pristine LS or MLS powder with different electrolyte solvents analogous to electrochemically generated Zintl phases being constantly exposed to electrolyte solvents in a battery due to volume changes.

Figure 3:
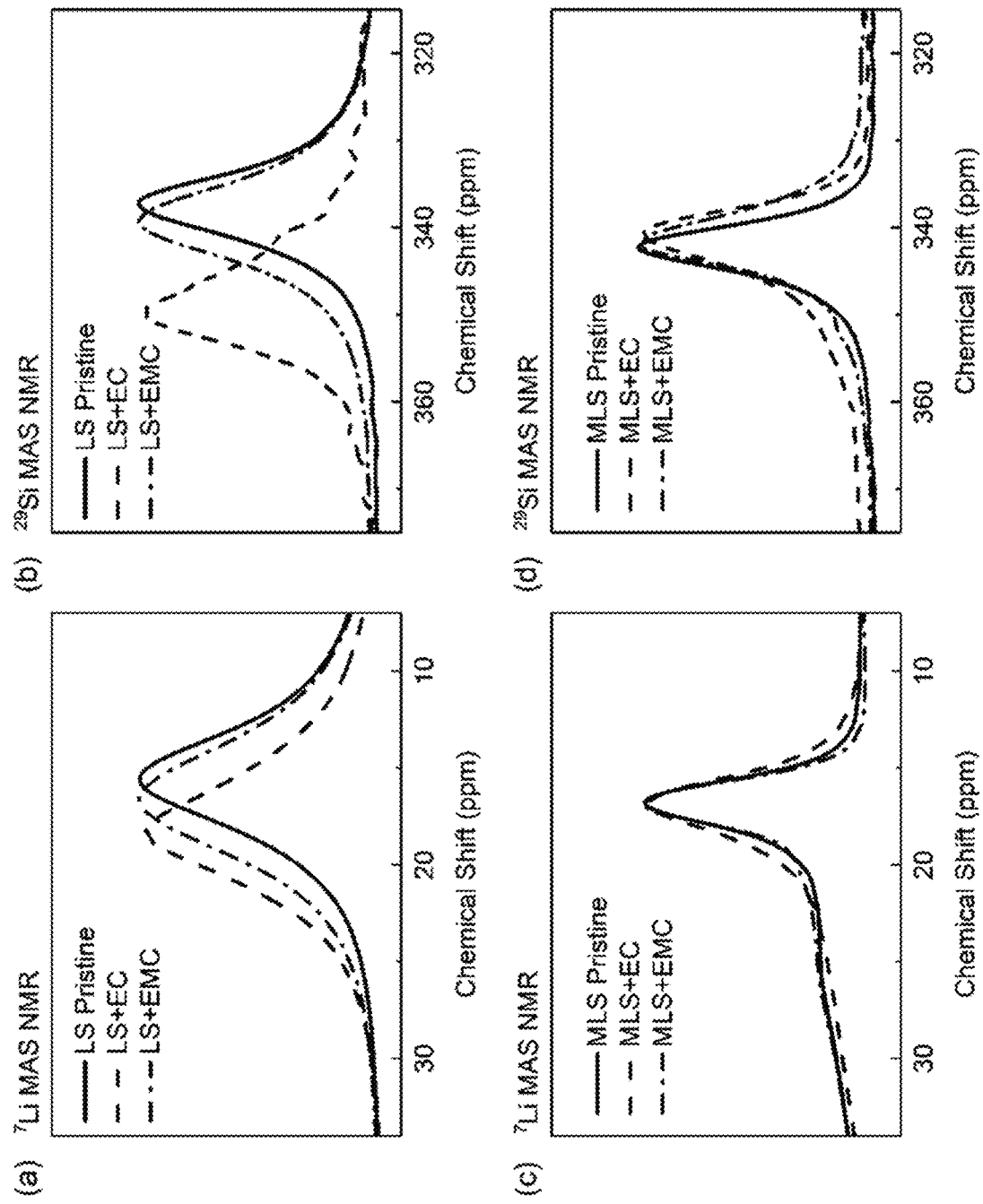
FIG. 3 illustrates (a) $^7$Li MAS NMR and (b) $^{29}$Si MAS NMR spectra of pristine LS model compound and its mixtures with EMC and EC, respectively, with the volume ratio of 1:1; (c) $^7$Li MAS NMR and (d) $^{29}$Si MAS NMR spectra of pristine MLS model compound and its mixtures with EMC and EC, respectively, with the volume ratio of 1:1. The mixture of LS+EC and MLS+EC have been heated up to 325 K and then cooled back to 298 K.

To investigate the in-situ reactions of model compounds in contact with different common electrolyte solvents, pristine LS and MLS powders were mixed with EC and EMC, respectively, with the volume ratio of 1:1, followed by NMR measurements. Since EC is in solid form at room temperature, the mixture of EC and LS powders were first heated to 325 K inside the NMR probe to let the EC melt and encompass the LS and MLS powders and then cooled back to room temperature for NMR measurements. FIG. 3, panels (a) and (b), show the $^7Li$ and $^{29}Si$ MAS NMR results of the mixture of LS with EMC and EC. Compared with the pristine LS, the mixture of LS and EC shows a positive chemical shift of 2.4 ppm in $^7Li$ NMR, and a significant change in $^{29}Si$ NMR, which suggests loss of $Li^+$ from the LS compounds. In comparison, the chemical shifts in $^7Li$ and $^{29}Si$ NMR after mixing LS with EMC are only 0.7 and 1.9 ppm, implying that EMC can be considerably less reactive in contact with LS and can cause less Li loss compared with EC.

Figure 4:
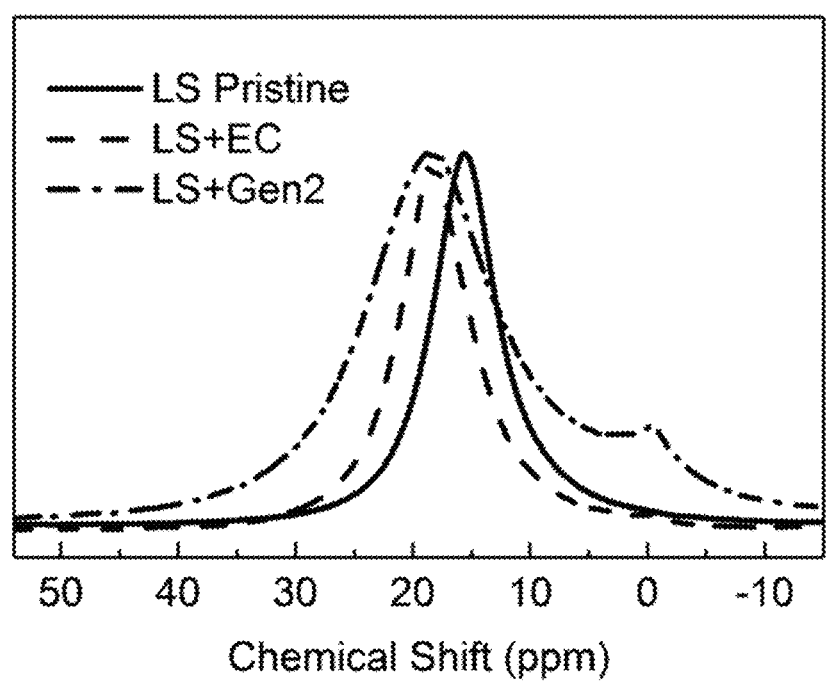
FIG. 4 illustrates $^7$Li MAS NMR results of pristine LS and its mixtures with EC and Gen2 electrolyte, with the volume ratio of 1:1.

In addition, the reactivity of LS with Gen2 electrolyte (which contains both EC and EMC) was tested, and the $^7Li$ NMR result showed that mixing LS with Gen2 electrolyte leads to peak shifts similar to the EC case (FIG. 4). After washing the LS+Gen2 mixture with DMC, $^{13}C$ NMR and $^1H$ NMR indicated the presence of insoluble carbonates. Based on the changes in $^7Li$ NMR results in FIG. 3, panel (a), and the deshielding observed in $^{29}Si$ resonance in FIG. 3, panel (b), the reactions shown in Scheme 1 are proposed, in which silicon anions in LS initiate the reaction losing electrons (and Li, not shown), and reducing and decomposing EC and EMC to produce organic lithiated carbonates with or without gas generation (e.g. LiEDC or LiEC/LiBDC, respectively). The reaction of EC with silicon anions was more pronounced spectroscopically, likely due to the prevalence of ring opening reactions. The results from the LS model compound are consistent with previously reported reaction mechanisms. On the other hand, the $^7Li$ NMR results in FIG. 3, panel (c), show that mixing MLS with EC only leads to a small peak shifts of about 0.3 ppm compared with the pristine MLS, which are much smaller than the peak shifts after mixing LS with EC in FIG. 3, panel (a). Similarly, the $^{29}Si$ NMR shifts after mixing MLS with EC (FIG. 3, panel (d)) are also much smaller than that after mixing LS with EC (FIG. 3, panel (b)). The peak shifts in $^7Li$ and $^{29}Si$ NMR after mixing MLS with EMC is even smaller. The above results imply that substituting Mg into the LS lattice can effectively stabilize the lithiated silicides against electrolyte solvents.

Scheme 1. Proposed Reactions for Decomposition of EC solvent

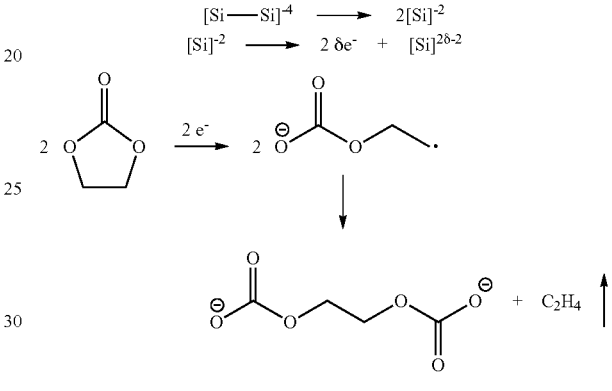

EX. 5

Electrode Evaluations and Results

The model compound chemical stability results are echoed in actual electrochemical cells, demonstrating that Mg and other metal salts as electrolyte additives stabilize the cycling of Si electrodes. Mg and Li cations co-insert into a Si electrode during the lithiation process, forming less-reactive metal-substituted LS species in an in-situ fashion and reducing the reactivity of charged Si anodes. $Mg(TFSI)_2$ was added into the baseline GenF electrolytes at a concentration of about 0.1 M to formulate the new GenFM electrolyte (see Table 1 for the formula and acronyms of all electrolytes).

Figure 5:
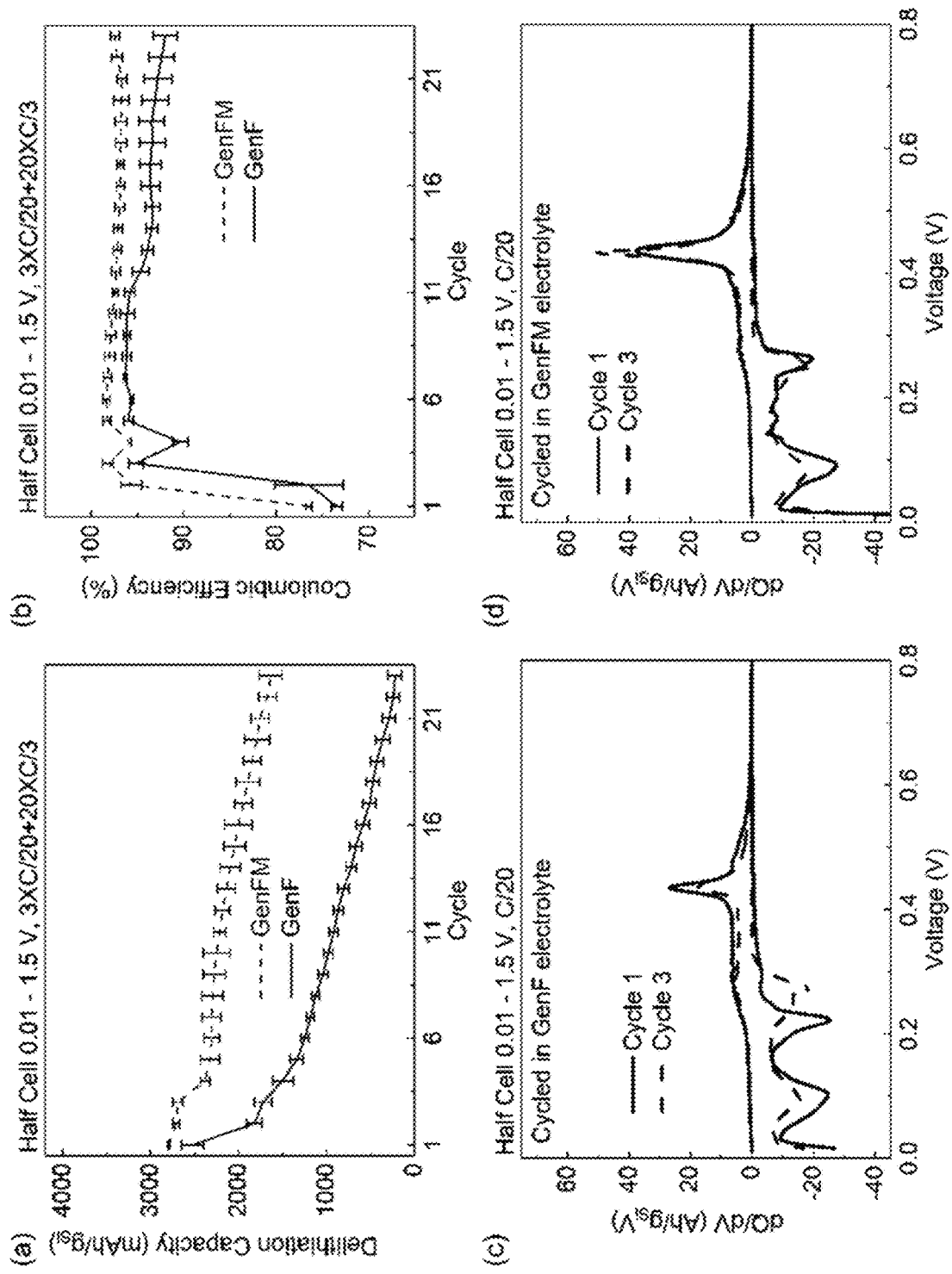
FIG. 5 provides half-cell electrochemical test results on Si electrodes. The GenF and GenFM electrolytes were used in the electrochemical tests. The delithiation capacities and coulombic efficiencies are shown in panels (a) and (b), respectively. The differential capacities at the first and third formation cycles in GenF and GenFM electrolytes are shown in panels (c) and (d), respectively. The cells were cycled between 0.01 V and 1.5 V, first at the rate of C/20 for 3 formation cycles, then at the rate of C/3 for aging cycles. The capacities are normalized by the mass of silicon. Error bars represents the standard deviations of at least three measurements for each sample.
Figure 6:
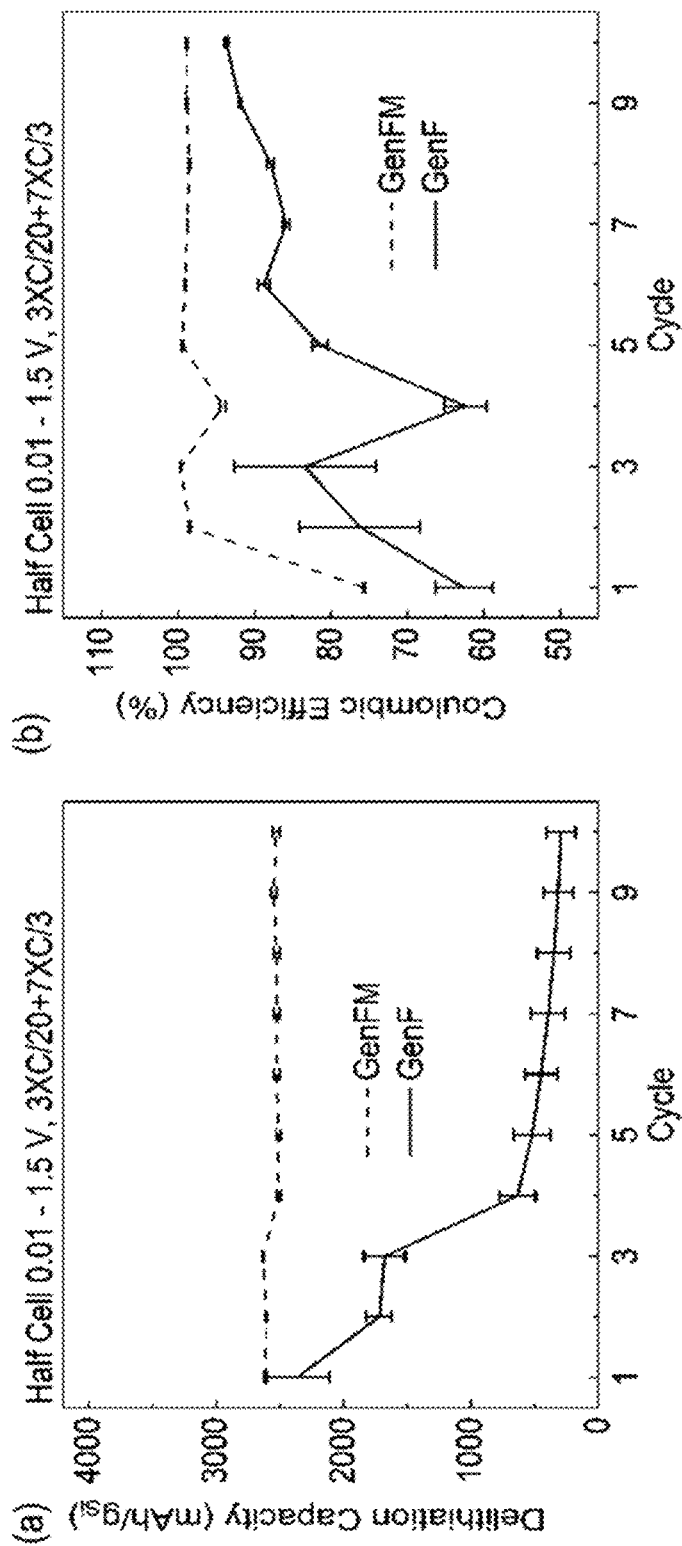
FIG. 6 shows half-cell electrochemical test results on Si electrodes with low-cutoff voltage holding during both formation and aging cycles. The GenF and GenFM electrolytes were used in the electrochemical tests. The delithiation capacities and coulombic efficiencies are shown in panels (a) and (b), respectively. The capacities are normalized by the mass of silicon. The cells were cycled from 0.01 to 1.5 V, first at the rate of C/20 for 3 formation cycles, then at the rate of C/3 for aging cycles. The cells were held at 0.01 V until the current is below C/50 at the end of each lithiation process during both formation and aging cycles. Extensive voltage holding at 0.01 V in every cycle results in eventual lithium plating and cell death after 15+ cycles for GenFM. Error bars represents the standard deviations of at least three measurements for each sample.

The half-cell results on Si electrodes are shown in FIG. 5. For the baseline GenF electrolyte with no Mg salt, the half-cell delithiation capacities start at about 2600 $mAh/g_{Si}$, and quickly drop to about 2000 $mAh/g_{Si}$ after three formation cycles at C/20. Then during the 20 fast C/3 cycles the capacities decrease from about 1500 to about 200 $mAh/g_{Si}$ with the coulombic efficiencies dropping from about 96% to about 92%. In comparison, in GenFM electrolyte containing 0.1 M $Mg(TFSI)_2$, the delithiation capacities start from about 2800 $mAh/g_{Si}$ in the first cycle, and are as high as 2650 $mAh/g_{Si}$ even after three formation cycles at C/20. During the 20 fast C/3 cycles, the capacities decrease from about 2200 to about 1650 $mAh/g_{Si}$ and the coulombic efficiencies are maintained at about 97%, which are much better than the baseline GenF electrolyte performance. The capacity drop in GenFM electrolyte from C/20 formation cycles to C/3 aging cycles is likely caused by a rise in cell impedance. If low-cutoff voltage holds are applied at 0.01 V until C/20 is reached at the end of lithiation process, during the formation cycles and the fast aging cycles, a remarkably stable delithiation capacity of about 2550 mAh/$g_{Si}$ is obtained, with coulombic efficiencies about 98.5% with the GenFM electrolyte (see FIG. 6) for 10-20 cycles until plating starts.

Figure 7:
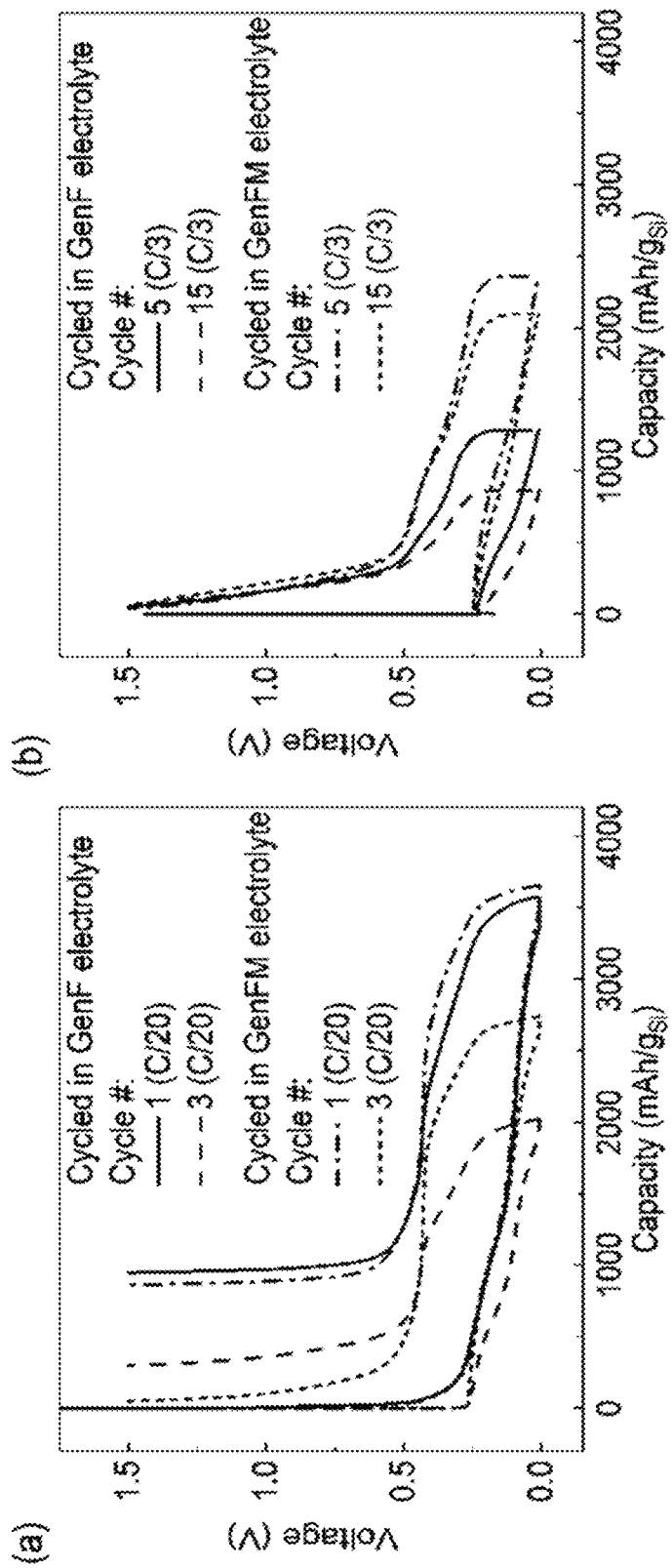
FIG. 7 shows representative half-cell voltage-capacity profiles of Si electrodes with GenF and GenFM electrolytes. The capacities are normalized by the mass of silicon. (a) The profiles of the 1st and 3rd cycles (all formations cycles at C/20). (b) The profiles of the 5th and 15th cycles (all aging cycles at C/3). The cells were cycled from 0.01 to 1.5 V, first at the rate of C/20 for 3 formation cycles, then at the rate of C/3 for aging cycles. The cells were held at 0.01 V until the current is below C/50 at the end of each lithiation process only during the formation cycles.

The dQ/dV profiles do not show any major changes in the electrochemistry between the GenFM and GenF electrolytes during the initial formation cycles (also see FIG. 7 for voltage profiles). When comparing the first formation cycle with the third formation cycle, in GenFM electrolyte, less peak shifts can be observed during both lithiation and delithiation processes compared with those in GenF electrolyte, which is consistent with the much better capacity retention observed in GenFM electrolyte. The dQ/dV profile (i.e. the voltage profile in FIG. 7) of the half-cell cycled in GenFM electrolyte is totally different from the cycling data on Mg—Si alloy anodes reported previously. Almost no contribution to the dQ/dV profile was observed from the addition of Mg salt, except subtle shifts of the lithiation peak at 0.21 V (to higher voltages) and the delithiation peak at 0.42 V (to lower voltages), which are likely due to small amounts of Mg inclusion into a Zintl phase. These results demonstrate that adding a magnesium salt (e.g., $Mg(TFSI)_2$) as a second salt in the electrolyte is a simple and effective way to suppress the side reactions between the electrolyte and Si electrodes without diminishing the high capacity of Li—Si chemistry, and at the same time increasing the retention rates and efficiencies of Si anodes, which is consistent with our model-compound observations.

To understand whether Mg is co-inserted into the Si anodes during the lithiation process, fully lithiated electrodes were harvested to obtain the active materials from the Cu foil for further characterization. The scratched electrode powders were washed with DMC to remove the precipitated Li and Mg salts left on the surface. The Si electrode lithiated in GenFM electrolyte (containing 0.1 M $Mg(TFSI)_2$) showed distinct but broad peaks in the XRD pattern, indicating the formation of $Li_{15}Si_4$ and $Li_{15-x}Mg_xSi_4$ phases (assuming a constant 15:4 ratio between cations and Si) with small-crystalline or semi-amorphous feature. The formation of a $Li_{14.65}Mg_{0.35}Si_4$ phase (Mg:Si ratio of about 1:11) was further confirmed by synchrotron HRXRD characterization and refinement analysis. Synchrotron HRXRD also confirmed a minor (042) reflection at 9.9° due to ternary formation that was not detected using lab X-rays due to low a low signal-to-noise ratio (S/N).

No crystalline compounds such as $Mg_2Si$ were detected by XRD, HRXRD, or TEM after lithiating the Si electrode in GenFM electrolyte. However, about 3% MgO was estimated from HRXRD as well as other less minor crystalline phases, the former likely due to the reaction of $Mg(TFSI)_2$ with water impurity (in the binder and the electrolyte) and/or the silicon oxide shell present on the pristine silicon particles and the latter due to other unconfirmed decomposition products such as $MgF_2$, $Mg(OH)_2$, other electrolyte reduction species etc. The EDS results of the lithiated material indicated that a significant amount of Mg was present both on the surface and in the bulk of lithiated Si particles with the Mg:Si ratio of about 1:9 after the lithiation in GenFM electrolyte, in agreement with HRXRD results, indicating that using Mg-containing electrolyte does allow for the co-insertion of Mg cations into the Si during the lithiation process, forming semi-crystalline Li—Mg—Si ternaries below the Mg:Si concentration in $Li_{14}MgSi_4$.

Figure 8:
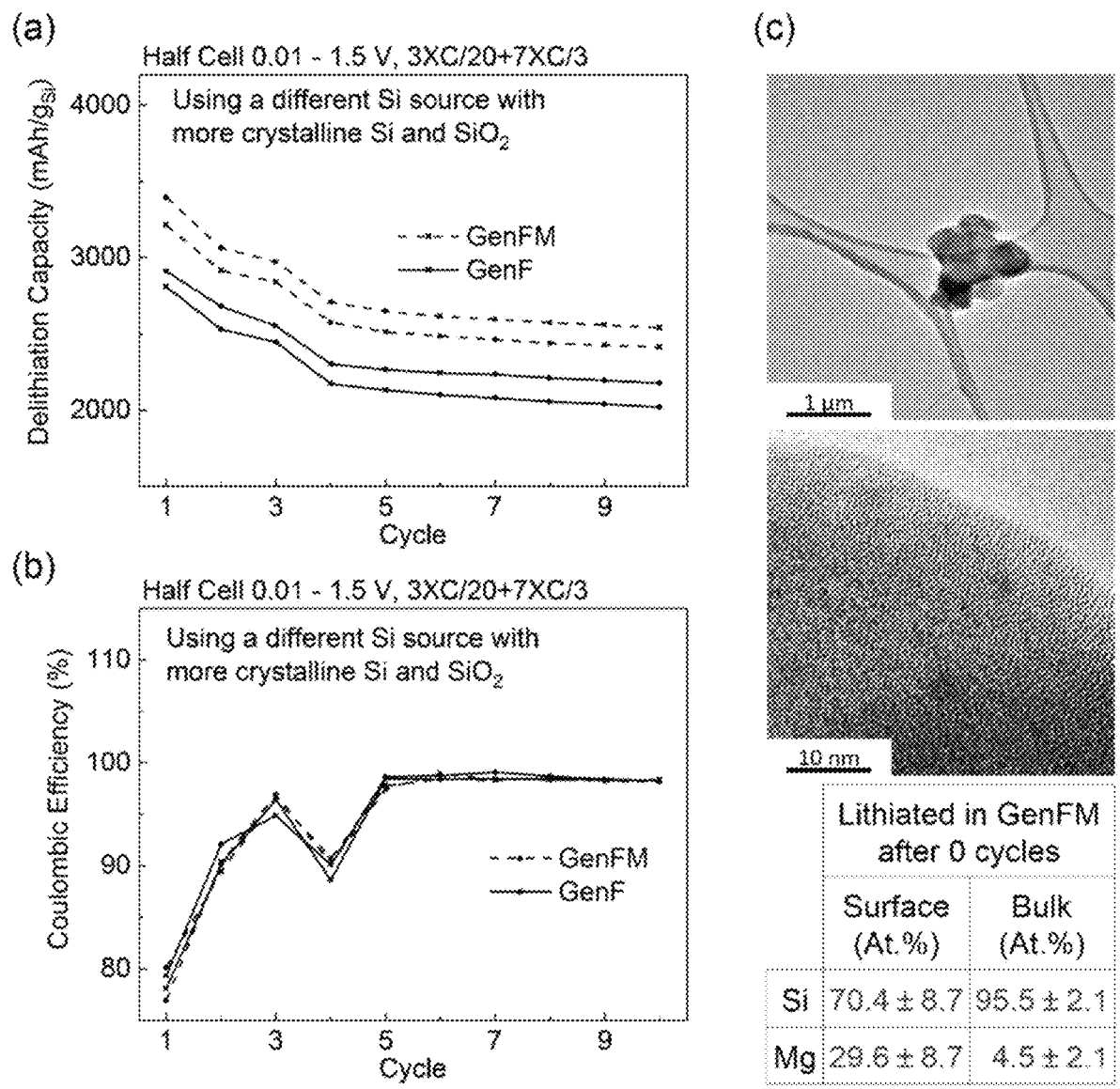
FIG. 8 provides (a) and (b) half-cell electrochemical test results (with low-cutoff voltage holding during both formation and aging cycles), and (c) TEM and EDS results of Si electrodes made by a different batch of PARACLETE silicon with more crystalline Si and $SiO_2$. The electrodes in (a) and (b) were cycled in GenF and GenFM electrolytes from 0.01 to 1.5 V, first at the rate of C/20 for 3 formation cycles, then at the rate of C/3 for 7 aging cycles. Two cells are made for each electrolyte formula to show the data are repeatable. The cells were held at 0.01 V until the current was below C/50 at the end of each lithiation process. TEM images and EDS results were taken on the Si electrode lithiated down to 0.01 V after 0 cycles in GenF electrolyte.

Formation Mg—Li or Mg—Si structures were not observed during the in situ Mg insertion/doping process, unlike previously reported cases where higher Mg contents were used in solid state. The electrode with 1 full lithiation/delithiation cycle was also studied and its XRD pattern did not indicate any crystalline phases. After delithiation to 1.5 V vs. Li in GenFM electrolyte, the Mg:Si molar ratios (from XRD) increased on the surface and decreased in the bulk compared to the fully lithiated sample. This implies that during the delithiation process, some Mg cations have migrated from the bulk of Si to the surface and/or trapped by the SEI layer. After 9 cycles in GenFM, when the Si electrode was fully lithiated again, Mg was still evenly distributed in the surface and bulk of the Si particles, however the Mg:Si ratio dropped down to about 1:20. It is interesting to note that if a different silicon batch with more crystalline Si and $SiO_2$ content is used (e.g. $SiO_x$), while an improvement in initial capacity and capacity retention was again noted, significantly more Mg can be found on the surface regions (see FIG. 8), consistent with the formation and stability of MgO, Mg being very oxophyllic.

Based on these results such oxophyllic M chemistries by nature are better suited to systems in which M can access Si more readily, and with binder, solvent and electrode active particles than have low water and oxide (e.g., $SiO_2$) content. The Si electrodes lithiated in GenFM electrolyte were also characterized by MAS NMR. The $^7Li$ NMR was used to evaluate the evolution of Li contents and its local environments after different number of cycles for fully lithiated electrodes. A peak around 0 ppm was observed from the diamagnetic Li species mainly in the SEI layer, while peaks at higher frequencies than 5 ppm were observed for the Li inserted into the Si. Compared with the electrochemically obtained $Li_{15+x}Si_4$ phase (peak around 6.7 ppm), a significant shift of 4.3 ppm in the Li resonance peak of lithiated Si electrode after initial discharge (marked with black dash line at 11.1 ppm) was observed.

The shift of the resonance towards high frequencies is consistent with the doping of Mg cations (with more valence electrons) into the fully lithiated Si electrode. No resonances due to $Li_{14}MgSi_4$ composition were observed (previously reported at 43 ppm), consistent with the previous EDS and XRD results. After 11 and 17 cycles in GenFM electrolyte, the $^7Li$ NMR of the re-lithiated Si electrodes exhibited a resonance shift to lower frequencies by −1.7 ppm, appearing at 8.6 ppm, suggesting a decrease in Mg concentration in the Zintl phase. This is consistent with the reduction in Mg:Si ratios after cycling observed in EDS analysis. Furthermore, the $^{29}Si$ NMR of the lithiated GenFM sample exhibited a peak center around −55 ppm. When compared with the $^{29}Si$ NMR of the electrochemically obtained $Li_{15+x}Si_4$ phase (marked with green dotted line), a difference of −127 ppm was observed, which is consistent with the positive shifts observed in $^7Li$ NMR results due to electron shielding/deshielding phenomena for the respective nuclei and indicates again the insertion of Mg into the Li—Si Zintl phase to form a ternary material. A peak at −110 ppm was observed, as well, due to the native $SiO_2$ shell in silicon starting material. Overall, the characterization results clearly indicated the incorporation of small concentrations of Mg in Li—Si chemistry.

Figure 9:
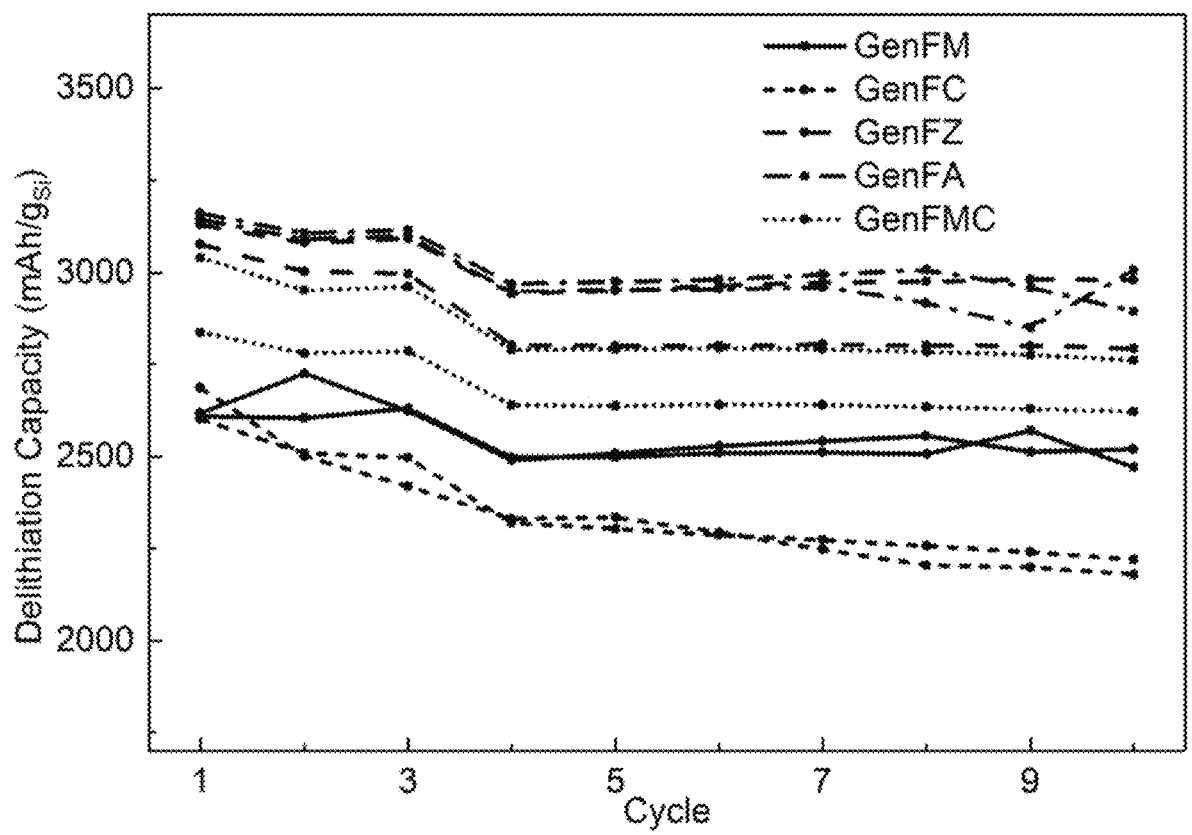
FIG. 9 shows half-cell electrochemical test results on Si electrodes using different secondary salts added into GenF-based electrolytes with low-cutoff voltage holding during both formation and aging cycles. The formula of the electrolyte all contained Gen2+ 10 percent by weight (wt %) FEC. The GenFM, GenFZ, GenFA, GenFC electrolytes contained a 0.1 M concentration of $Mg(TFSI)_2$, $Zn(TFSI)_2$, $Al(TFSI)_3$, and $Ca(TFSI)_2$, respectively. The GenFMC electrolyte contained 0.05 M $Mg(TFSI)_2$+0.05 M $Ca(TFSI)_2$. The cells were cycled between 0.01 and 1.5 V, first for 3 formation cycles at C/20, then for 7 aging cycles at C/3. Two cells were made for each electrolyte formula to show the data are repeatable.

$Zn(TFSI)_2$, $Ca(TFSI)_2$, and $Al(TFSI)_3$ were also added into the GenF electrolyte as the secondary salts for Si anodes and tested. The half-cell electrochemical test results in FIG. 9 show that with Zn— or Al-containing electrolytes, the Si electrodes also show high capacity of about 2800 mAh/$g_{Si}$. The capacity retention rates of the half cells with Zn— or Al-containing electrolytes are similar if not better to that of the Mg-containing electrolyte. In comparison, adding Ca cation into the GenF electrolyte leads to slightly lower capacity and lower retention rate than GenFM, but its performance is still much better than the GenF baseline. This indicates that adding the secondary cations in the electrolyte that can promote the formation of stable ternary phases is a simple and effective way in general to stabilize the Si electrodes for Li-ion batteries. In addition, a mixture of Mg salt and Ca salt was evaluated an electrolyte (i.e. the GenFMC electrolyte). As shown in FIG. 9, the GenFMC electrolyte with a mixture of Mg and Ca cations showed higher capacity and better cyclability than both GenFM and GenFC electrolytes, indicating that the introducing of multiple additional beneficial cations into the electrolyte could also improve the cell performance, with maybe even better synergetic effects. However, as will be discussed below, electrochemical compatibility of the secondary cation can be important. For example, GenFZ electrolyte did not perform well in full-cell configurations, while it was effective in a half-cell configuration. This is most likely because Zn ion is known to be active in the positive electrodes, whereas Al and Ca ion are known to be just as inactive as Mg ion with positive electrodes.

Figure 10:
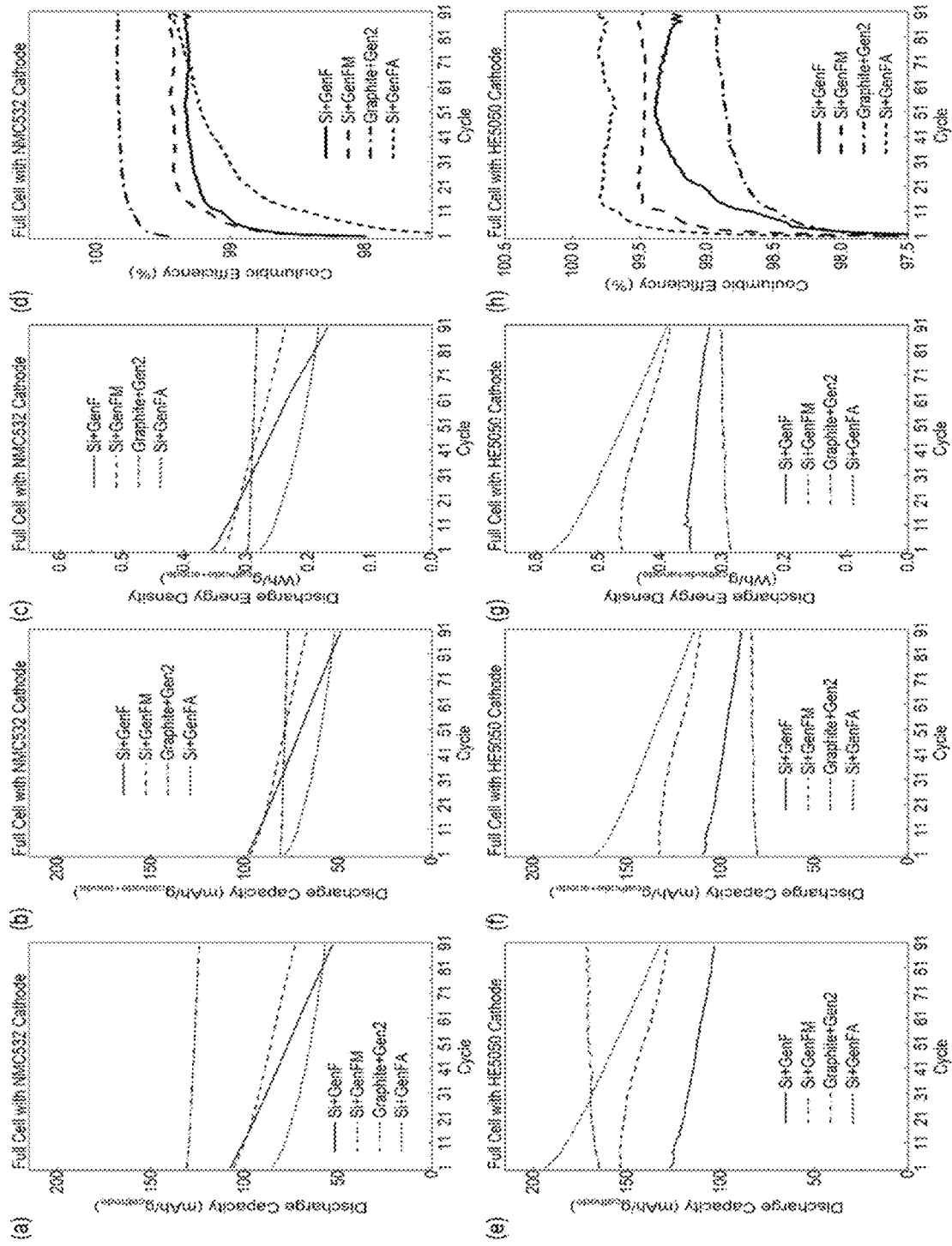
FIG. 10 shows full-cell electrochemical test results. Cells in panels (a)-(d) consist of NMC532 cathodes and Si or graphite anodes (formation cycles are not shown). Cells in panels (e)-(h) consist of HE5050 cathodes and Si or graphite anodes (formation cycles are not shown). At the end of each charge step the cells were held at 4.1 V until the current dropped below C/50. The discharge capacities in panels (a) and (c) are normalized by the weights of cathode materials (NMC523 or HE5050). The discharge capacities and discharge energy densities in panels (b), (c), (f), and (g) are normalized by the total weights of cathode materials (NMC523 or HE5050) and anode materials (Si or graphite). Trend lines for the columbic efficiencies in (d) and (h) were calculated by a moving average of 15 adjacent points.
Figure 11:
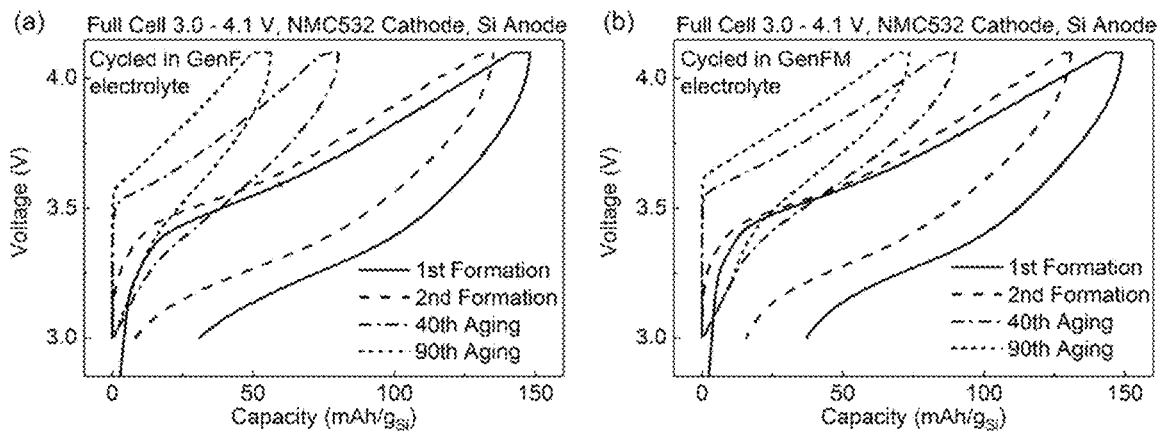
FIG. 11 shows representative voltage profiles for full cells using NMC532 cathodes, graphite-free Si anodes, and GenF or GenFM electrolytes, respectively. The 1st and 2nd formation cycles, as well as the 40th and 90th aging cycles are shown. The cells were cycled from 3.0 to 4.1 V, first at the rate of C/20 for 3 formation cycles, then at the rate of C/3 for aging cycles. The cells were held at 4.1 V until the current is below C/50 at the end of each lithiation process.

In order to evaluate real-world battery performance against two standard baselines (Si+GenF and graphite+Gen2), the new electrolyte formulations were tested in a full-cell configuration in coin cells using standard commercially relevant electrodes (electrode loading levels described above under "Material Preparation"). Full cells were assembled using NMC532 ($LiNi_{0.5}Mn_{0.3}Co_{0.2}O_2$) or Li-rich HE5050 ($Li_{1.2}Ni_{0.2}Co_{0.2}Mn_{0.6}O_2$) cathodes countered by graphite-free Si anodes or traditional graphite anodes. The full-cell configurations were chosen based on the observations that neither M cation intercalates into graphite nor has an appreciable insertion chemistry related to the selected cathodes. The full-cell electrochemical performance is shown in FIG. 10, and the representative voltage profiles are shown in FIG. 11.

For the combination of NMC532 cathode+Si anode, when aggressively cycled between 3.0 V and 4.1 V at C/3 (with 4.1 V holds at the end of each charge cycle), using GenFM electrolyte can lead to a higher capacity retention rate of 68% over 90 cycles compared with that using baseline GenF electrolytes (49% over 90 cycles). Such improved capacity retention rate is still lower than the baseline graphite-anode result (96% over 90 cycles), but further developments in optimized and compatible binders and electrolyte formulations as well as new Si materials can certainly improve this performance further. Simply using Si anodes dramatically increases the specific total electrode weight capacity and energy density of the full-cell configuration, as shown in FIG. 10, panels (b) and (c). Adding a secondary Mg salt into the electrolyte brought an improvement of about 0.15% to the coulombic efficiency (see FIG. 10, panel (d)), which were over 99.3% although still lower than that of graphite-anode full cells (about 99.5%).

Figure 12:
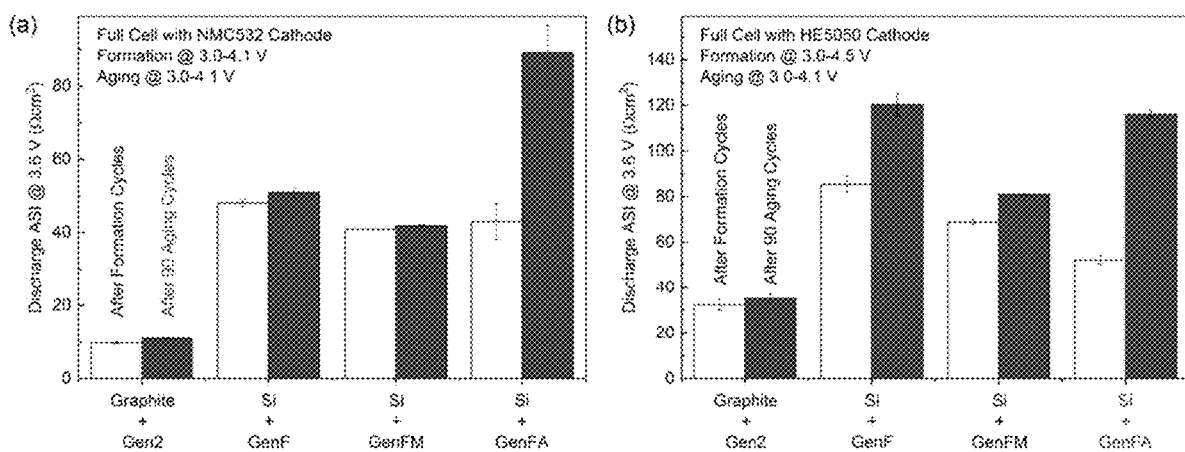
FIG. 12 shows discharge area specific impedance (ASI) results of full cells, measured during the HPPC cycles after the initial formation cycles and after 90 aging cycles. Cells in panel (a) consist of NMC532 cathodes and Si or graphite anodes, aged by cycling between 3.0 and 4.1 V at C/3 after three formations cycles between 3.0 and 4.1 V at C/20. At the end of each charging process the cells were hold at 4.1 V until the current was dropped below C/50 in order to accelerate the aging effects. Cells in panel (b) consist of HE5050 cathodes and Si or graphite anodes, aged by cycling between 3.0 and 4.1 V at C/3 after three formations cycles between 3.0 and 4.5 V at C/20.
Figure 13:
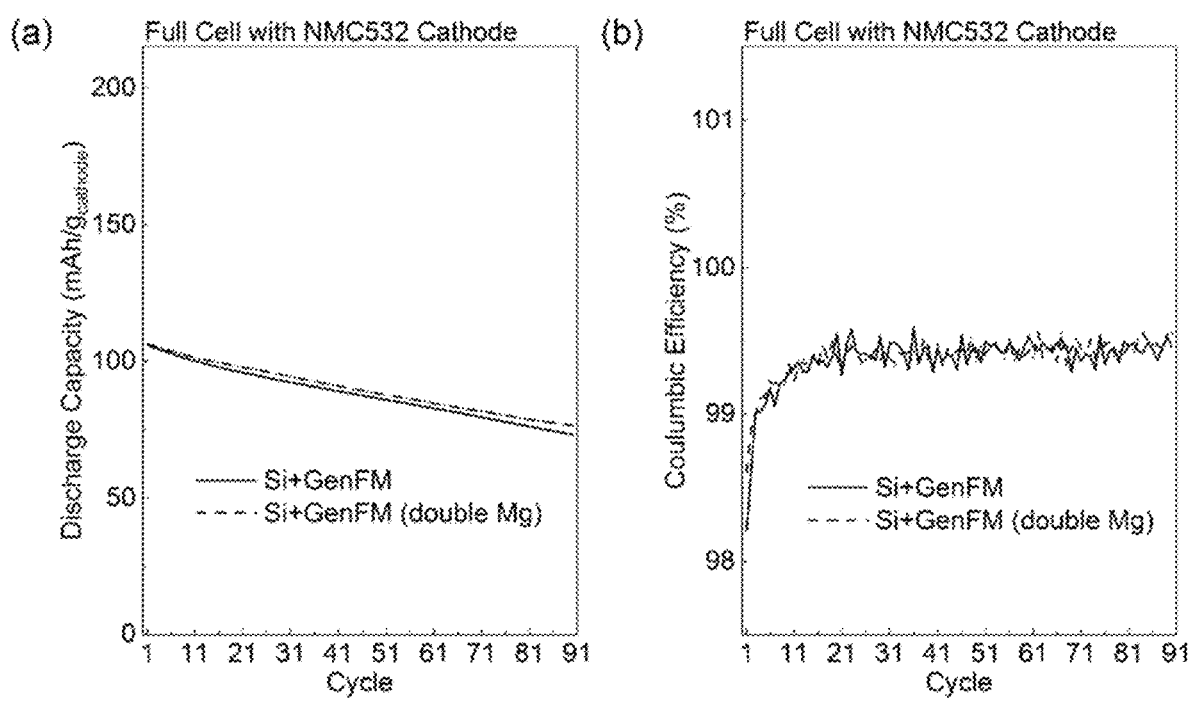
FIG. 13 shows full-cell electrochemical test results using standard GenFM vs. double-Mg-co-salt electrolyte (i.e. GenF+0.2 M $Mg(TFSI)_2$). The full cells consist of NMC532 cathodes and Si anodes, cycled between 3.0 and 4.1 V at C/3 after three formations cycles between 3.0 and 4.1 V at C/20 (formation cycles are not shown). The discharge capacities in panel (a) are normalized by the weights of cathode materials (NMC523).
Figure 14:
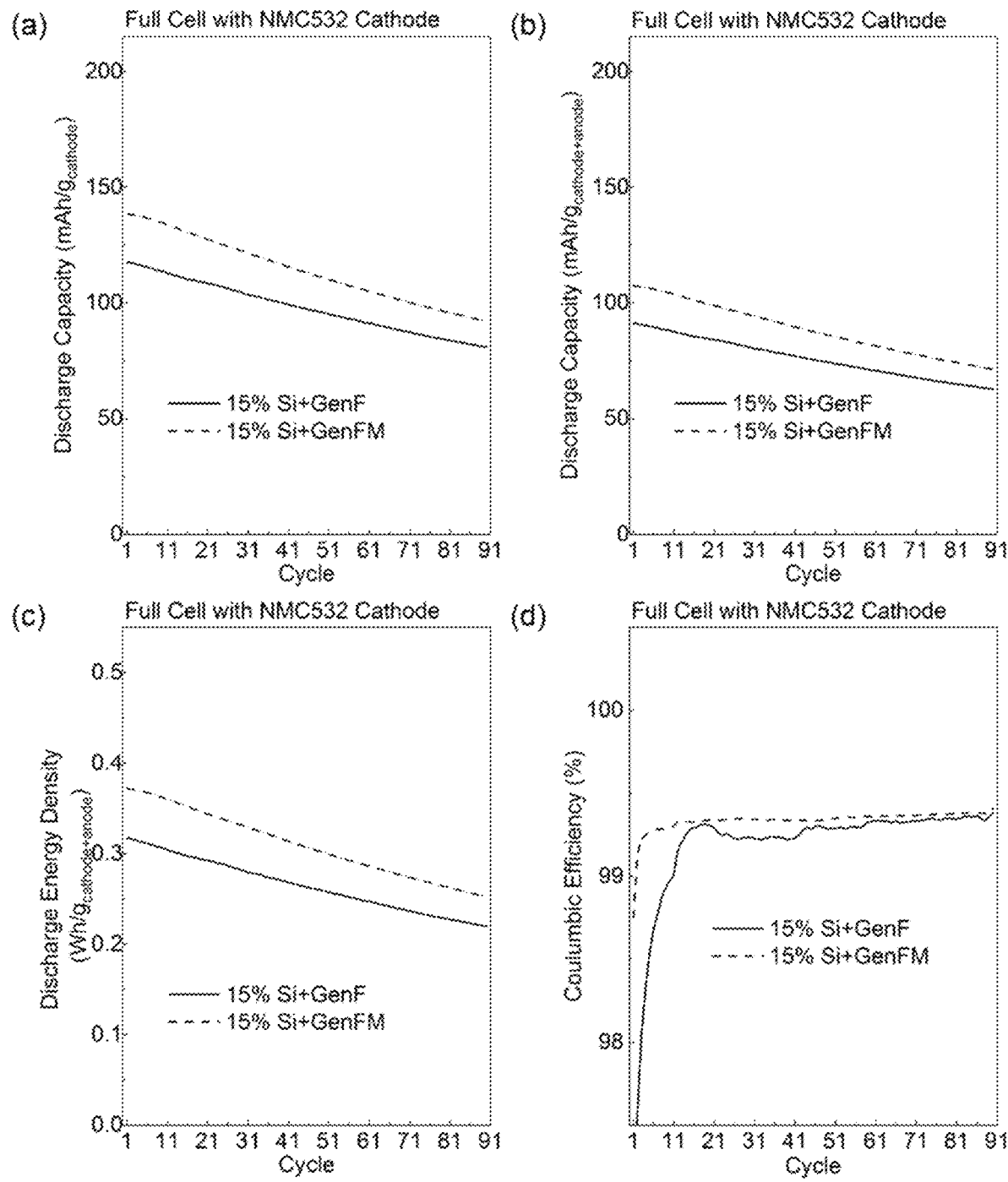
FIG. 14 shows full-cell electrochemical test results. Cells in panels (a)-(d) consist of NMC532 cathodes and 15 wt % Si+73 wt % graphite anodes, cycled between 3.0 and 4.1 V at C/3 after three formations cycles between 3.0 and 4.1 V at C/20 (formation cycles are not shown). The discharge capacities in panel (a) are normalized by the weights of cathode materials (NMC523). The discharge capacities and energy densities in panels (b) and (c) are normalized by the total weight of cathode material (NMC523) and anode materials (Si+graphite). Trend lines for the columbic efficiencies in (d) were calculated by a moving average of 15 adjacent points.

In addition, using Mg—Li mixed salts leads to lower initial impedance after the formation cycles as well as after 90 aging cycles, as shown in FIG. 12, panel (a), which is likely caused by a more favorable SEI formation on Si electrodes with Mg co-insertion. Doubling the Mg concentration does not provide any obvious benefits to capacity or cyclability (see FIG. 13), suggesting enough Mg is provided for the co-insertion process. The fact that no negative response is detected with 0.2 M $Mg(TFSI)_2$, additional salt reservoir can be used to avoid depletion of the secondary salt due to extrusion or other reactions in certain long life applications. Another feature of the new chemistry is that the new formulations are fully compatible with graphitic anodes and can be used with graphite+silicon blends. As shown in FIG. 14, the full cells made by 15% Si+73% graphite blended electrodes vs. NMC532 cathodes gain very similar performance improvements in the GenFM electrolyte, clearly demonstrating that the Mg salt is not impacting the electrochemistry at the graphite anode.

On the other hand, if Li-rich layered oxides (TODA HE5050 with 20% additional Li) were used with an increased voltage cutoff to 4.5V during the initial three C/20 formation cycles for the activation and the removal of extra Li, the additional Li extracted from the cathode can be used to compensate the greater amount of Li consumption during the initial SEI formation on Si anodes, which is commonly referred as the 1st cycle irreversible capacity loss. As a result of such intrinsic prelithiation, much higher capacities can be obtained by using the combination of Li-rich HE5050 cathode+Si anode when again cycled aggressively between 3 and 4.1 V using GenFM electrolyte, as shown in FIG. 10, panel (e). Here the high-voltage cutoff of the formation cycles should be high enough that enough Li can be extracted to compensate the initial Li consumption, and at the same time not too high to cause the structural damage on cathodes or Li plating on the anode. In this paper, the high-voltage cutoff of the formation cycles was selected as 4.5 V, because it can provide better electrochemical performance than the lower (4.1 V) or higher (4.7 V) cutoffs, as shown in FIG. 15.

Figure 15:
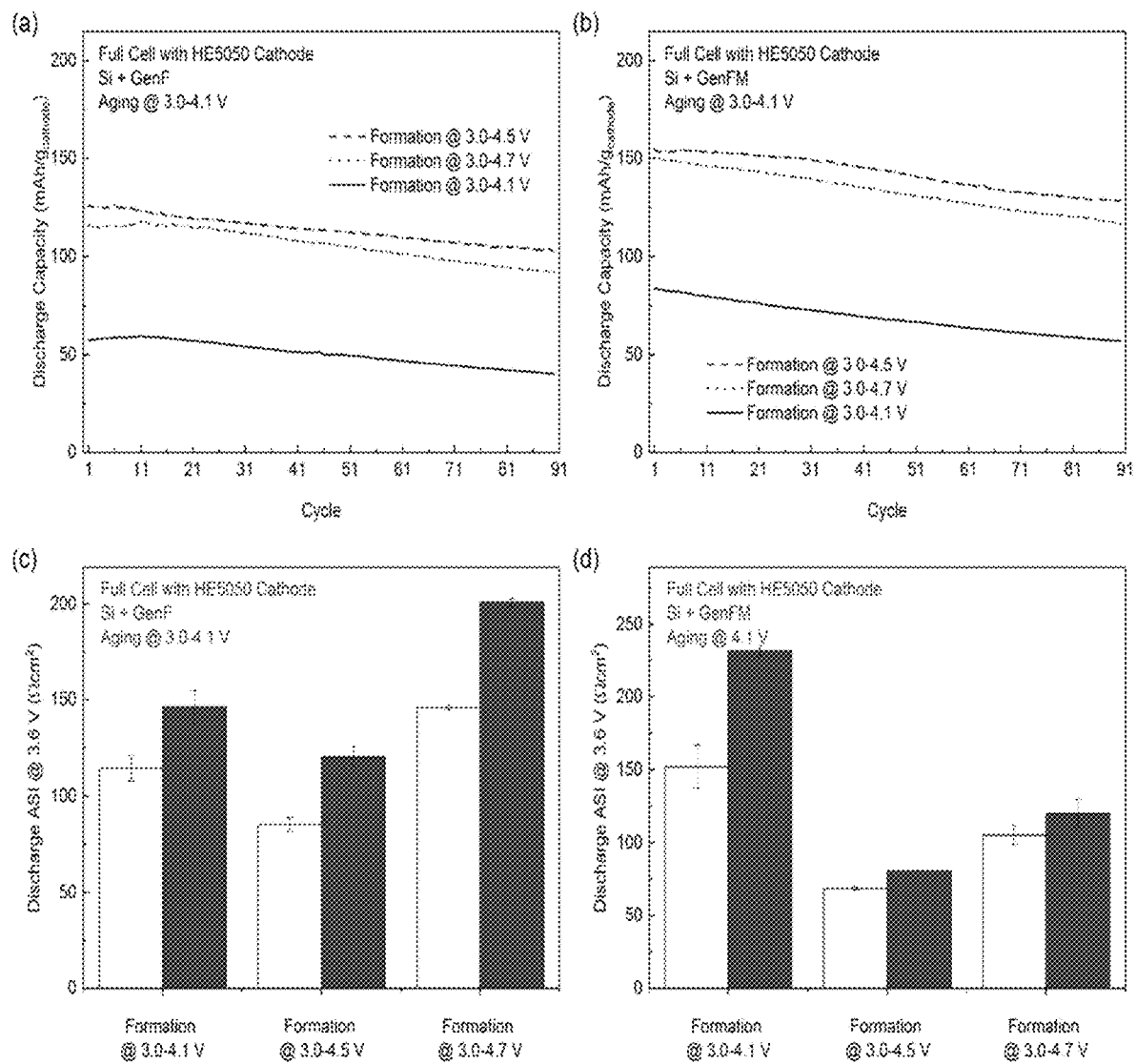
FIG. 15 shows discharge capacities and ASI results of full cells consist of Li-rich HE5050 cathodes and Si or graphite anodes, aged by cycling between 3.0 and 4.1 Vat C/3 after three formations cycles between different voltage ranges at C/20 (capacities of the formation cycles are not shown). At the end of each charging process during aging cycles the cells were held at 4.1 V until the current was dropped below C/50. The ASI were measured during the HPPC cycles after the initial formation cycles and after 90 aging cycles. Cells in panels (a) and (c) used GenF electrolyte. Cells in panels (b) and (d) used GenFM electrolyte.

The results in FIG. 15 show that for both GenF and GenFM electrolytes, formation between 3.0-4.5 V showed higher capacity, better cyclability, and lower impedance than those with formation cycles between 3.0-4.1 V and 3.0-4.7 V. This likely is because, for formation cycles between 3.0-4.1 V, the high-voltage cutoff is not high enough to provide enough Li for initial SEI formation, leading to severe capacity loss. For formation cycles between 3.0-4.7 V, the high-voltage cutoff is too high that the structure of cathode materials can be damaged and/or the anode reaches too low a voltage (can lead to plating), leading to lower capacity retention and higher impedance. To optimize the electrochemical performance with Li-rich cathodes, neither too low nor too high cutoff voltages are needed during the formation cycles. Therefore, 3.0-4.5 V was selected to be the voltage range for formation cycles in this paper for full cells with HE5050 cathodes.

Figure 16:
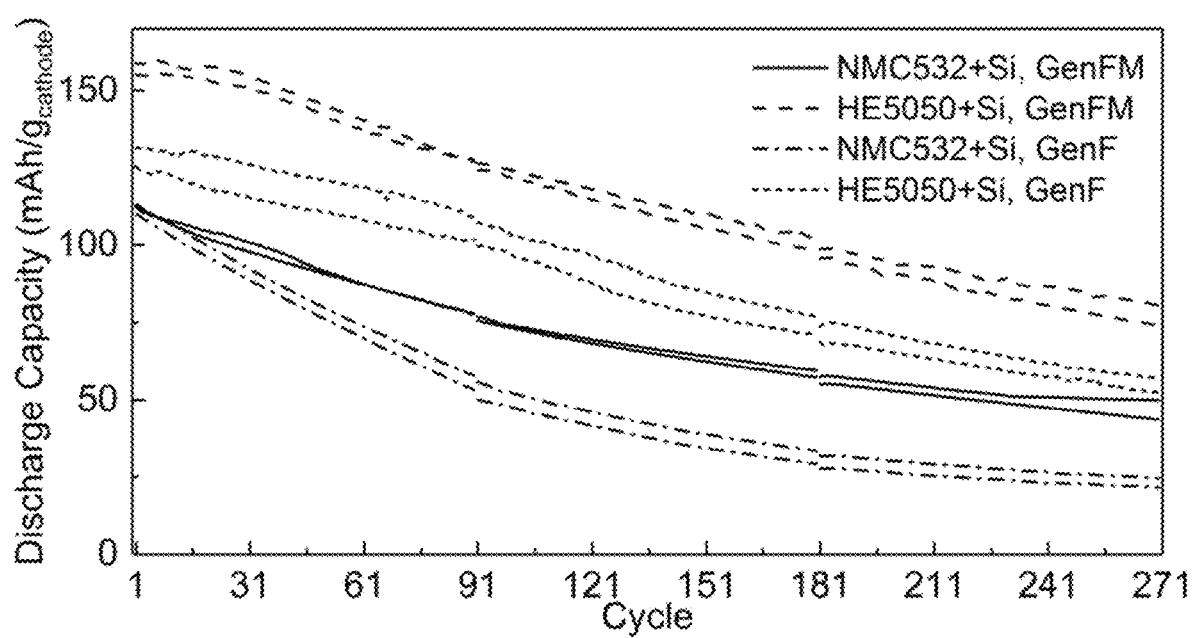
FIG. 16 shows discharge capacities of full cells using GenFM and Gen F electrolytes with extended cycles. The full cells consisting of NMC532+Si electrodes were cycled between 3.0 and 4.1 V at C/3 after three formations cycles between 3.0 and 4.1 V at C/20 (formation cycles are not shown). The full cells consisting of HE5050+Si electrodes were cycled between 3.0 and 4.1 V at C/3 after three formations cycles between 3.0 and 4.5 V at C/20 (formation cycles are not shown). At the end of each charging process during aging cycles the cells were hold at 4.1 V until the current was dropped below C/50. Two cells were tested for extended cycles on each cathode to show that the lifetime of the full cells are repeatable.
Figure 17:
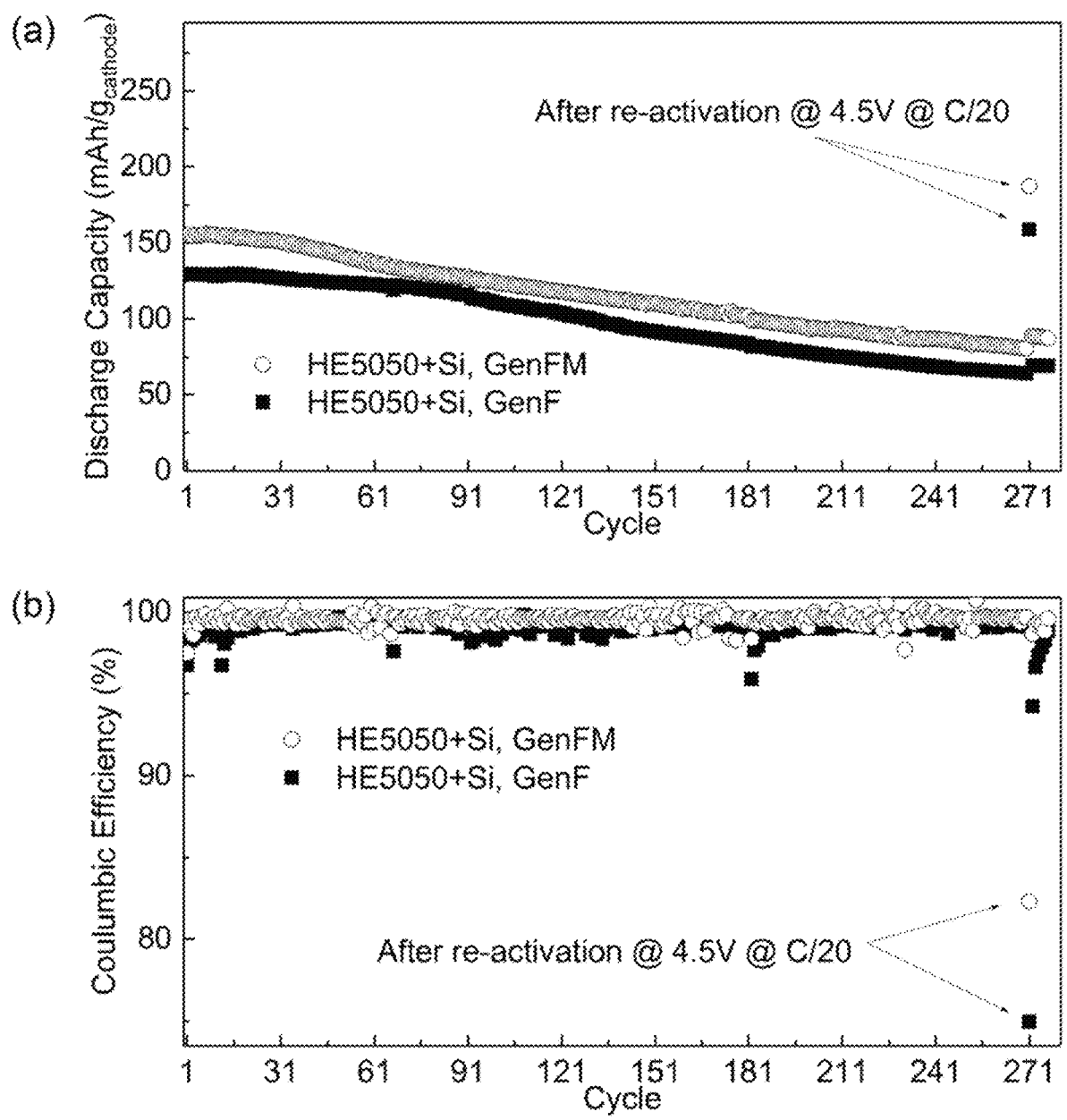
FIG. 17 shows (a) discharge capacities, and (b) coulombic efficiencies of full cells consist of Li-rich HE5050 cathodes and Si anodes, using GenFM and GenF electrolytes. The extended-cycled cells are reactivated by a single "formation" cycle at C/20 between 3.0 and 4.5 V after the 270th aging cycle. About 5 mAh/$g_{cathode}$ gain in overall cell capacity was observed after reactivation.

FIG. 10, panels (e)-(g) show that after adding Mg into the GenF electrolyte, the discharge capacities and energy densities of the HE5050+Si full cells surprisingly increased by about 30%, indicating that adding Mg secondary salt is an effective way to reduce the Li loss during the initial SEI formation with more abundant Li source. Adding Mg salt also leads to lower initial impedance and slower impedance increase after 90 aging cycles, as shown in FIG. 12, panel (b). The positive effect of intrinsic prelithiation can also be seen in unusually high initial coulombic efficiency values about 99.4% for silicon, approaching levels that can only be obtained with graphite-only anodes. FIG. 10, panel (g) shows the combined effect of using a Si electrode with GenFM electrolyte against a Li-rich electrode on the full cell electrochemical performance. The total active material weight specific energy density surpasses both graphite anode and silicon anode baselines by a remarkable 30% after 90 cycles. The cells tested above show stable extended cycling performance in FIG. 16, with about 80 mAh/$g_{cathode}$ capacity after 270 cycles for cells with Li-rich cathodes (33% higher over baseline), and about 55 mAh/$g_{cathode}$ after 270 cycles for cells with NMC532 cathodes (120% higher over baseline). After 270 cycles, the Si electrodes in HE5050+Si full cells cycled in GenFM electrolyte shows a bulk Si:Mg ratio of about 24:1, indicating there was still some Mg left inside of the Si particles after long cycling. Almost no Mg was detected in HE5050 cathode particles after 270 cycles (except for some potentially unwashed Mg salt left on the surface), indicating that Mg has little influence on the cathode. Li rich cathodes can also be activated further (beyond formation cycles) during aging cycles by supplying additional Li to "condition" the Li-diminished cell at the expense of some cathode average voltage, as shown in FIG. 17, which could be a further useful feature of this specific anode-cathode couple. The dramatic and surprising increase in performance for lithium-limited systems such as NMC532 cathodes and the compounded improvement in performance gained via use of mixed salts and intrinsic prelithiation clearly rationalize further improvements in capacities, cyclabilities, and efficiencies that can be obtained by optimizing other cell components such as binders and Si materials.

Figure 18:
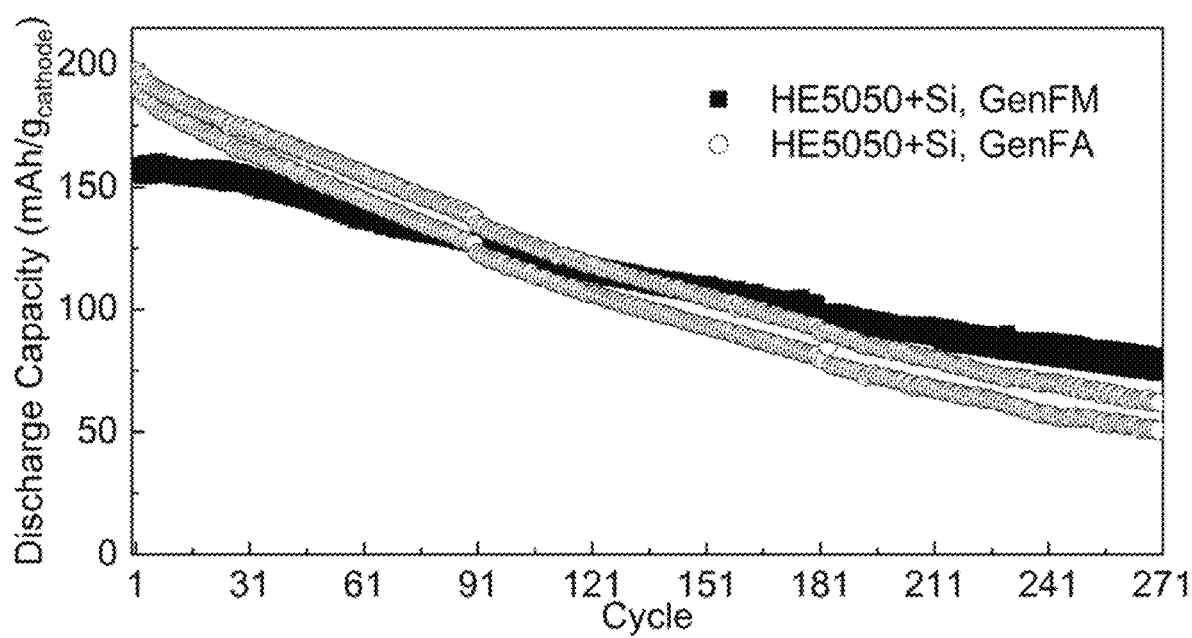
FIG. 18 shows discharge capacities of full cells using GenFM and GenFA electrolytes with extended cycles. The full cells were cycled between 3.0 and 4.1 V at C/3 after three formations cycles between 3.0 and 4.1 V at C/20 (formation cycles are not shown). At the end of each charging process during aging cycles the cells were hold at 4.1 V until the current was dropped below C/50. Two cells were tested for extended cycles on each cathode to show that the lifetime of the full cells are repeatable.

GenFA and GenFZ electrolytes with Al and Zn salts were also tested in full-cell configurations. In the case of GenFZ electrolyte, the full cell lost all capacity promptly during the first formation cycle of the cycling protocol (data not shown), which is most likely due to the activity of Zn-ion in the cathode. On the other hand, the Al-salt like Mg works compatibly in the full-cell configuration. As shown in FIG. 10, using Al-containing GenFA electrolyte leads to a lower coulombic efficiency compared with other electrolytes. GenFA also causes fast impedance rising over cycles, as shown in FIG. 12. When paired with NMC532 cathodes, GenFA leads to lower initial capacity but better capacity retention than the GenF baseline, which let it outperform the GenF electrolyte after about 80 cycles. When paired with HE5050 cathodes, GenFA shows the initial capacity even higher than GenFM, but with a worse capacity retention, which might be due to its high capacity utilization or fast rising impedance. Extended cycles for GenFA showed more decay in cyclability and performance when compared to GenFM (see FIG. 18). It must be noted that despite the best efforts, GenFA electrolyte in pristine state had a yellow tint that could be due to impurities originating from the salt or indicative of some degradation. The differences in electrochemical performance trends observed between GenFM and GenFA can be due to a number of factors originating from the complexity of the battery systems.

Figure 19:
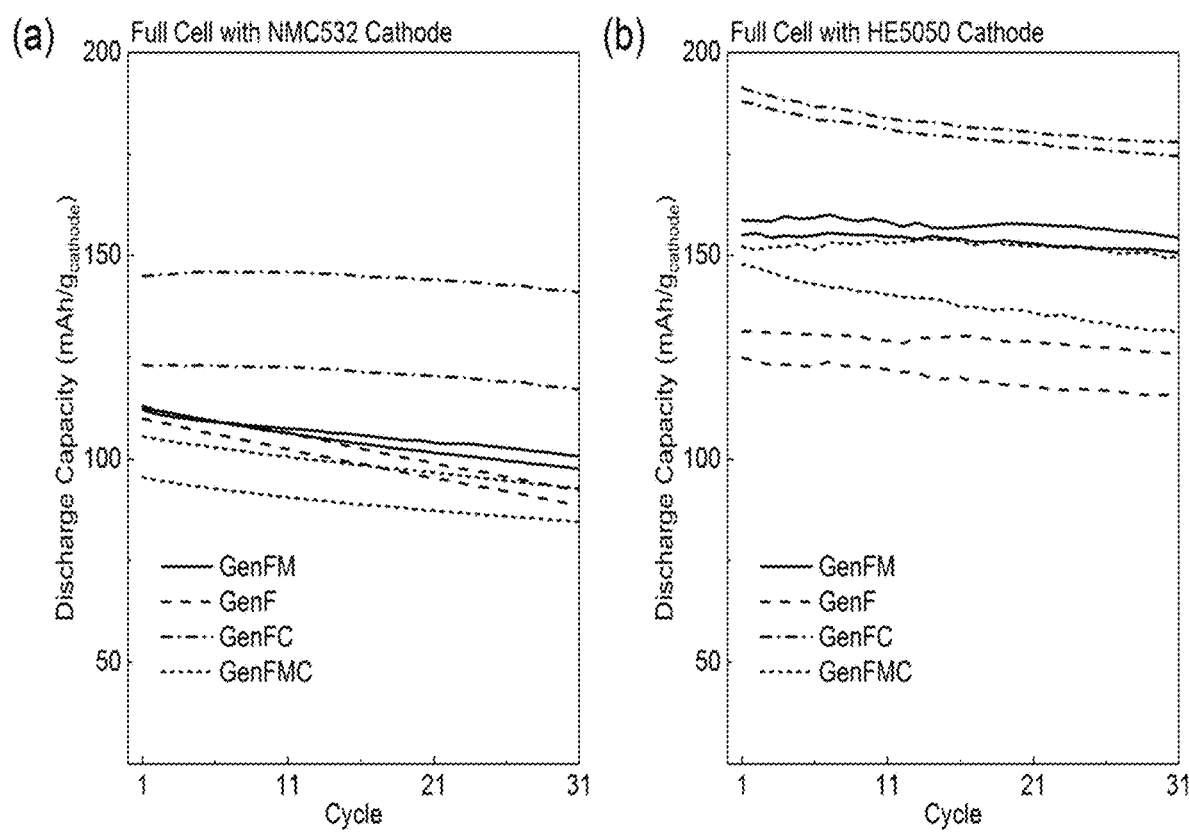
FIG. 19 shows discharge capacities of full cells using GenF, GenFM, GenFC, and GenFMC electrolytes. (a) The discharge capacities of full cells consisting of NMC532+Si electrodes, which were cycled between 3.0 and 4.1 V at C/3 after three formations cycles between 3.0 and 4.1 V at C/20 (formation cycles are not shown). (b) The discharge capacities of full cells consisting of HE5050+Si electrodes, which were cycled between 3.0 and 4.1 V at C/3 after three formations cycles between 3.0 and 4.5 V at C/20 (formation cycles are not shown). Two cells were tested for extended cycles on each cathode to show the repeatable.

In addition, GenFC and GenFMC electrolytes were also tested in full-cell configuration. As shown in FIG. 19, using Ca-containing GenFC electrolyte exhibited higher discharge capacity and similarly stable cyclability compared with GenFM electrolyte in both NMC532 and HE5050 configurations. For GenFMC electrolyte, the full-cell capacities were lower than GenFM and GenFC, while the half-cell performance was better than those two electrolytes. The cation and anion of the secondary salt, the starting Si material, the binder and the solvent choices all can play a role in the electrochemical performance of a silicon full-cell.

EX. 6

Use of Triglyme as Electrolyte Solvent with Si Anodes

Figure 20:
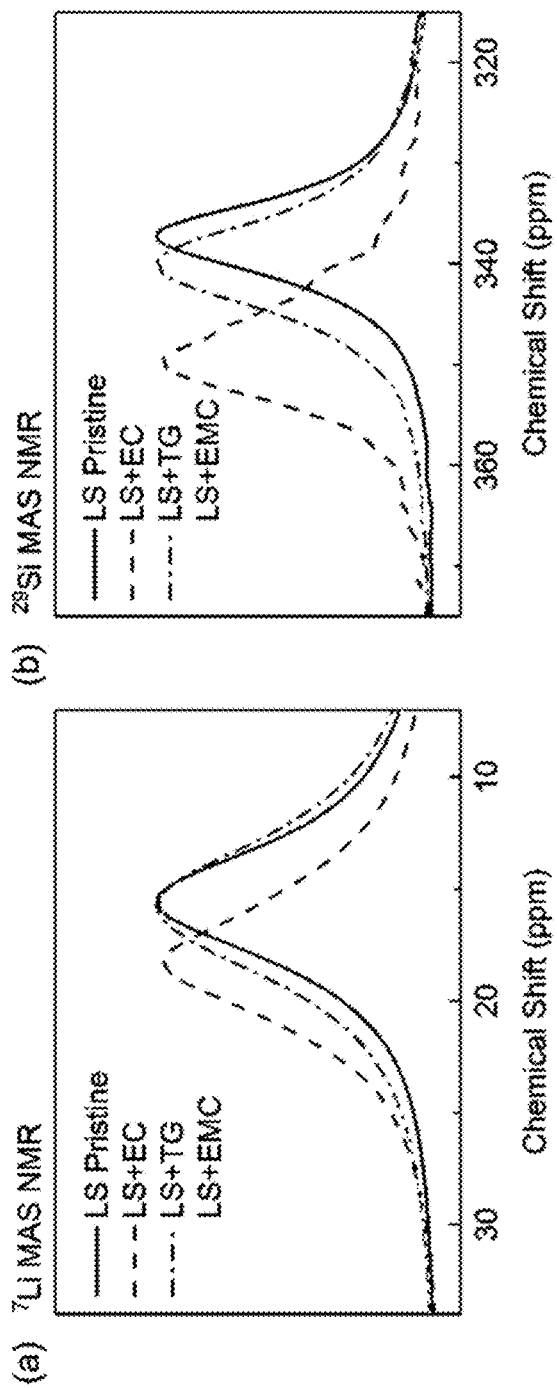
FIG. 20 illustrates (a) $^7$Li MAS NMR and (b) $^{29}$Si MAS NMR spectra of pristine LS model compound and its mixtures with TG, EMC and EC, respectively, with the volume ratio of 1:1. The mixture of LS+EC was heated up to 325 K and then cooled back to 298 K.
Figure 21:
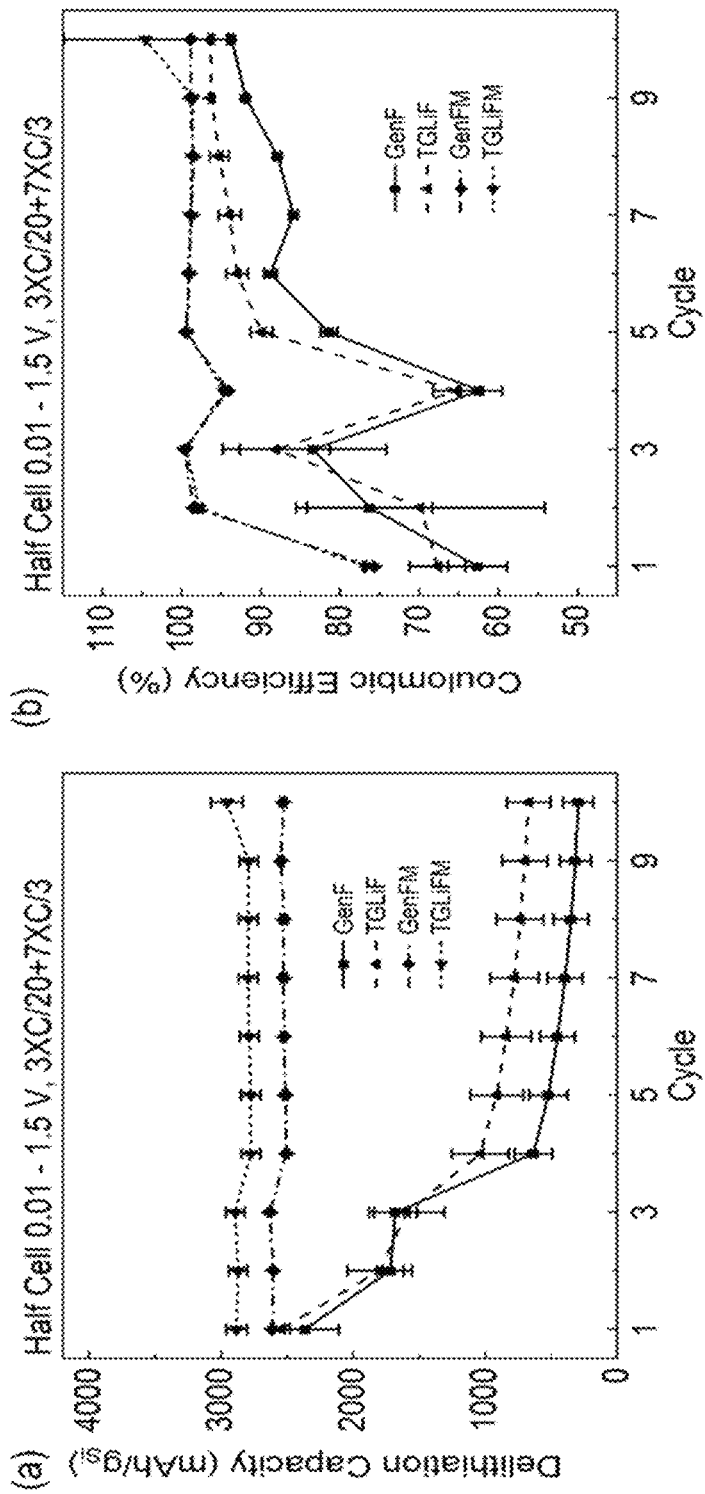
FIG. 21 shows half-cell electrochemical test results on Si electrodes using TG-containing electrolytes were used in the electrochemical tests. The delithiation capacities and coulombic efficiencies are shown in panels (a) and (b), respectively. The cells were cycled between 0.01 V and 1.5 V, first at the rate of C/20 for 3 formation cycles, then at the rate of C/3 for aging cycles. The capacities are normalized by the mass of silicon. The cells were held at 0.01 V until the current is below C/50 at the end of each lithiation process during both formation and aging cycles. Error bars represents the standard deviations of at least three measurements for each sample.

In addition to the Gen2-based (i.e. EC/EMC-based) electrolyte, we also tried TG-based electrolyte to reduce the interaction between electrolytes and lithiated Si electrodes. The NMR characterization on the mixture of TG and LS model compounds is presented in FIG. 20, which shows that, compared with the mixture of EC and LS, mixing TG with LS leads to smaller shifts in and $^{29}$Si peaks. These results imply that TG is more stable than EC in contact with lithiated Si materials, which is confirmed by the half-cell electrochemical measurements shown in FIG. 21. In half-cell tests, the discharge capacity of the cells using GenF electrolyte dropped below 300 mAh/$g_{Si}$ after 10 cycles, while the cells using TGLiF electrolyte exhibited a capacity of over 650 mAh/$g_{Si}$ after 10 cycles. The coulombic efficiency of the cells with TG-based TGLiF electrolyte was also about 2.5% higher than the coulombic efficiency of the Gen2-based GenF electrolyte. In addition, as illustrated in other examples herein, adding a secondary metal salt such as Mg(TFSI)$_2$ in Gen2-based electrolyte can effectively improve the capacity retention and efficiency. A similar effect is observed after adding the secondary M salt into the TG-based electrolyte. As shown in FIG. 21, adding 0.1 M Mg(TFSI)$_2$ into TGLiF electrolyte (i.e. using TGLiFM electrolyte) can greatly improve the capacity retention rate and coulombic efficiencies compared with the cells using TGLiF electrolyte without the salt. The cells using TGLiFM electrolyte had even higher capacity than the GenFM electrolyte cells, which could be caused by the less-reactivity of TG in contact with lithiated Si, as mentioned earlier.

EX. 7

Exemplary Electrochemical Cell and Battery

Figure 22:
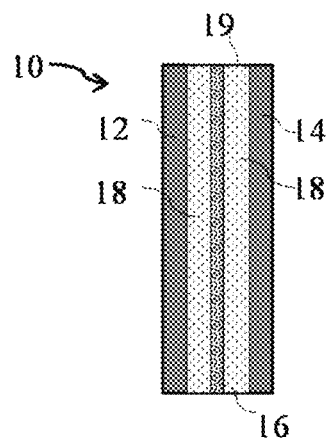
FIG. 22 schematically illustrates an electrochemical cell.
Figure 23:
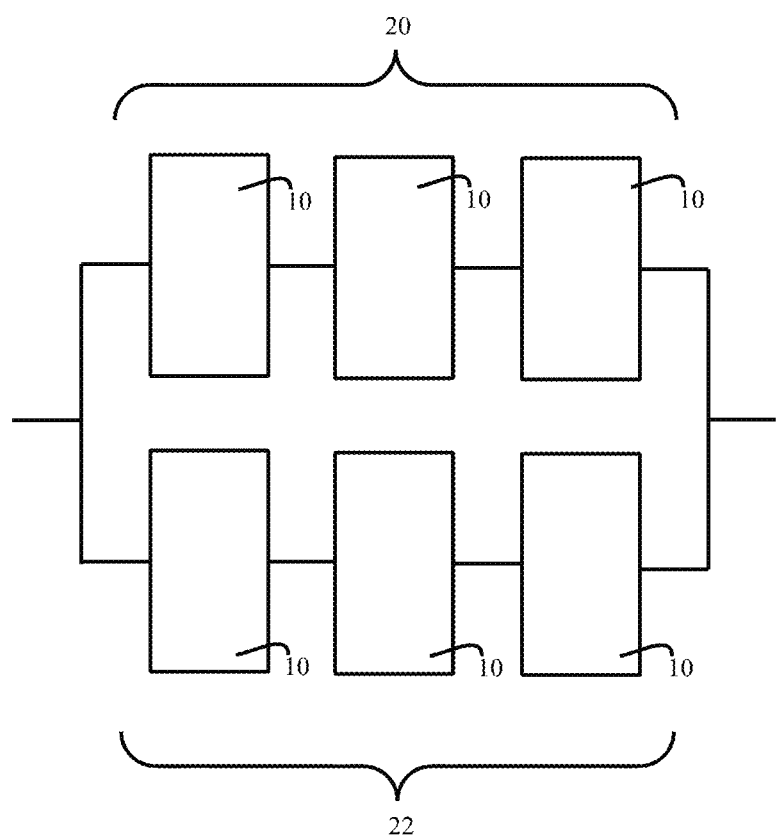
FIG. 23 schematically illustrates a battery comprising a plurality of an electrochemical cells electrically connected together.

FIG. 22 schematically illustrates a cross-sectional view of Li-ion electrochemical cell 10 comprising a first electrode 12 (e.g., comprising metallic or carbon current collector coated with a material capable of reversibly accepting and releasing lithium ions, such as an NMC compound; or comprising metallic lithium), and silicon-containing second electrode 14, with a porous separator 16 (e.g., a polypropylene microporous separator, a polyethylene/polypropylene/polyethylene microporous separator, a polyethylene microporous separator; a poly(vinylidene-difluoride)-polyacrylonitrile graft copolymer microporous separator; and the like) between electrodes 12 and 14. Electrolyte 18, comprising a lithium electrolyte salt (e.g., LiPF$_6$) and an additional salt additive in a non-aqueous solvent contacts electrodes 12 and 14 and separator 16. Optionally, one or both of electrodes 12 and 14 also can include a particulate carbon material. The electrodes, separator and electrolyte are sealed within housing 19. FIG. 23 schematically illustrates a lithium battery comprising a first array 20 consisting of three series-connected electrochemical cells 10, and a second array 22 consisting of three series-connected electrochemical cells 10, in which first array 20 is electrically connected to second array 22 in parallel.

Selected Conclusions

As described herein, Li-M-Si ternary phases in charged silicon electrodes are chemically stable against common electrolyte solvents and can be formed, in situ, through electrochemical co-insertion after adding Mg, Ca, or Al salt additives to the electrolyte. Adding one or more Mg, Ca, Al, Zn, or other metal salts of metals known to form Zintl phases with Si and Li (e.g., Ni, Pd, Cu, K, Na, Zr, Nd, Pt, Ag, Ir, Ba, Sr, Eu, Rh, B, La, Ge, Y, In, Au, Ce, or Ga salts) stabilizes the lithiated Si phases and reduces side reactions with the electrolytes. The electrochemical test results in half-cells show higher capacities, superior cyclabilities, and improved coulombic efficiencies with the new silicon electrolyte formulations containing a Mg, Zn, Ca, or Al salt (as well as their mixtures, such as Mg and Ca salts) in addition to the primary lithium salt (e.g., LiPF$_6$) of the electrolyte, when compared to the standard electrolyte without the salt additive.

Using Mg-containing lithium electrolyte in NMC full-cells improved the coulombic efficiencies by 0.15% and in turn the capacity retention rates by about 40% after 90 cycles. The impedance characteristics were also improved after adding the Mg salt. In addition, Li-rich cathodes can be used effectively to couple with silicon electrodes for intrinsic prelithiation via the activation of the cathode at high voltages during formation cycles or even after extended cycling, which can dramatically increase the usable silicon capacities on top of the gains in coulombic efficiencies and retention rates, surpassing full cell energy densities of cells coupled to graphite electrodes after 90 cycles. Extended-cycle tests showed performance retention and Mg activity even after 270 cycles. Similar full-cell performance improvements can also be found via the addition of an Al or Ca salt into the electrolyte. The battery chemistry demonstrated in herein introduces a whole new and synergistic approach to stabilize silicon anodes and has the promise to be a fundamental building block in widespread application of Si anodes in lithium-ion batteries, particularly when used in conjunction with the advances in binder, electrolyte, and Si material developments, as well as new pre-lithiation methods.

In addition, use of triglyme as an electrolyte solvent, with or without the metal salt additives (e.g. a Mg salt or other Li-M-Si Zintl-phase formation metal salt mentioned above), can provide higher capacities, higher capacity retention rates, and higher coulombic efficiencies compared with the EC/EMC-based electrolytes.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. An electrolyte for a lithium-ion electrochemical cell with a silicon anode; the electrolyte comprising consisting of:
   a lithium salt at a concentration in the range of about 0.1 M to about 5 M; and an additional metal salt at a concentration in the range of about 0.001 to about 5 M, and fluoroethylene carbonate as an additive, both of which are dissolved in a non-aqueous organic solvent; wherein;
   the non-aqueous organic solvent is one or more material selected from the group consisting of an ether, a linear carbonate, a cyclic carbonate, an ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone;
   the additional metal salt consists of a metal cation and one or more anion selected from the group consisting of: bis(trifluoromethanesulfonyl)imidate (TFSI), 2-trifluoromethyl-4,5-dicyanoimidazolate (TDI$^-$), 4,5-dicyano-1,2,3-triazolate (DCTA$^-$), trifluoromethanesulfonate (Tf$^-$), perchlorate (ClO$_4^-$), bis(oxalato)borate (BOB$^-$), difluoro(oxalato)borate (DFOB$^-$), tetrafluoroborate (BFF), hexafluorophosphate (PF$_6$), thiocyanate (SCN$^-$), bis(fluorosulfonyl)imidate (FSI$^-$), bis(pentafluoroethylsulfonyl)imidate (BETI), tetracyanoborate (B(CN)$_4^-$), hexafluoroarsenate (AsF$_6^-$), nitrate, triflate (OTf$^-$), dicvanamide [N(CN)$_2^-$], methylsulfate (MeSO$_4$), dimethylphosphate (Me$_2$SO$_4^-$), acetate (MeCO$_2^-$), chloride (Cl$^-$), bromide (Br$^-$), iodide (I$^-$), tetrakis(3,5-bis(trifluoromethyl)phenyl)borate (BArF$^-$), carba-closo-dodecaborate (CB$_{11}$YX$_{12}^-$), and a substituted carba-closo-dodecaborate of formula CB$_{11}$YX$_{11}$, wherein X and Y are selected from halogen and hydrogen;
   the lithium salt is one or more salts selected from the group consisting of lithium bisftrifluoromethanesulfonyl)imidate (Li TFSI), lithium 2-trifluoromethvl-4,5-dicvanoimidazolate (LiTDI), lithium 4,5-dicyano- 1,2,3-triazolate (LiTDI), lithium trifluoromethanesulfonate (LiTf), lithium perchlorate (LiClO4), lithium bis(oxalato)borate (LiBOB), lithium difluoro(oxalato)borate, (LiDFOB), lithium tetrafluoroborate (LiBFA lithium hexafluorophosphate (LiPF$_6$), lithium thiocyanate (LiSCN) lithium bistfluorosulfonyl)imidate (LIFSI), lithium bistpentafluoroethylsulfonyl)imidate (LBETI), lithium tetracyanoborate (LiB(CN)$_4$), lithium hexafluoroarsenate (Li AsF$_6$) and lithium nitrate; and the additional metal salt is selected from the group consisting of a magnesium salt, an aluminum salt, a calcium salt, a zinc salt, a salt comprising another metal cation that can form a Zintl phase with Li and Si, and a combination of two or more such salts;

wherein the fluoroethylene carbonate is present in the electrolyte at a concentration in the range of about 0.001 to about 12 M.

2. The electrolyte of claim 1, wherein the additional metal salt is selected from the group consisting of Mg(TFSI)$_2$, Al(TFSI)$_3$, Ca(TFSI)$_2$, Zn(TFSI)$_2$, and a combination of two or more thereof.

3. The electrolyte of claim 1, wherein the non-aqueous organic solvent comprises is (a) an ether selected from the group consisting of glyme, diglyme, triglyme, and tetraglyme; (b) an organic carbonate other than ethylene carbonate; or (c) a combination of (a) and (b).

4. The electrolyte of claim 1, wherein the lithium salt is LiPF$_6$.

5. A lithium-ion electrochemical cell consisting of:
(a) a first electrode;
(b) a second electrode comprising elemental silicon;
(c) a microporous separator membrane between the first electrode and second electrode; and
(d) an electrolyte in contact with the electrodes and the membrane; the electrolyte consisting of a lithium salt at a concentration in the range of about 0.1 M to about 5 M, and an additional metal salt at a concentration in the range of about 0.001 to about 5 M, and fluoroethylene carbonate as an additive, which are dissolved in an a non-aqueous organic solvent;

wherein;

the non-aqueous organic solvent is one or more material selected from the group consisting of an ether, a linear carbonate, a cyclic carbonate, an ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone;

the additional metal salt consists of a metal cation and one or more anion selected from the group consisting of: bis(trifluoromethanesulfonyl)imidate (TFSI), 2-trifluoromethyl-4,5-dicyanoimidazolate (TDI$^-$), 4,5-dicyano-1,2,3-triazolate (DCTA$^-$), trifluoromethanesulfonate (Tf$^-$), perchlorate (ClO$_4^-$), bis(oxalato)borate (BOB$^-$), difluoro(oxalato)borate (DFOB$^-$), tetrafluoroborate (BFF), hexafluorophosphate (PF$_6^-$), thiocyanate (SCN$^-$), bis(fluorosulfonyl)imidate (FSI$^-$), bis(pentafluoroethylsulfonyl)imidate (BETI), tetracyanoborate (B(CN)$_4$ $^-$, hexafluoroarsenate (AsF$_6^-$), nitrate, triflate (OTf$^-$), dicvanamide [N(CN)$_2^-$], methylsulfate (MeSO$_4$ $^-$), dimethylphosphate (Me$_2$SO$_4^-$), acetate (MeCO$_2^-$, chloride (Cl$^-$), bromide (Br$^-$), iodide (I$^-$), tetrakis(3,5-bis(trifluoromethyl)phenyl)borate (BArF$^-$), carba-closo-dodecaborate (CB$_{11}$YX$_{12}^-$), and a substituted carba-closo-dodecaborate of formula CB$_{11}$YX$_{11}$, wherein X and Y are selected from halogen and hydrogen;

the lithium salt is one or more salts selected from the group consisting of lithium bisftrifluoromethanesulfonyl)imidate (Li TFSI), lithium 2-trifluoromethvl-4,5-dicvanoimidazolate (LiTDI), lithium 4,5-dicyano- 1,2, 3-triazolate (LiTDI), lithium trifluoromethanesulfonate (LiTf), lithium perchlorate (LiClO$_4$), lithium bis(oxalato)borate (LiBOB), lithium difluoro(oxalato)borate, (LiDFOB), lithium tetrafluoroborate (LiBFA lithium hexafluorophosphate (LiPF$_6$), lithium thiocyanate (LiSCN) lithium bistfluorosulfonyl)imidate (LIFSI), lithium bistpentafluoroethylsulfonyl)imidate (LBETI), lithium tetracyanoborate (LiB(CN)$_4$), lithium hexafluoroarsenate (Li AsF$_6$) and lithium nitrate; and the first electrode comprises metallic lithium or a cathode active material capable of donating and accepting lithium ions to and from the second electrode during electrochemical cycling; the additional metal salt is selected from the group consisting of a magnesium salt, an aluminum salt, a calcium salt, a zinc salt, a salt comprising another metal cation that can form a Zintl phase with Li and Si, and a combination of two or more such salts; with the proviso that the selected additional metal salt does not react with the cathode active material, when present in the first electrode, wherein the fluoroethylene carbonate is present in the electrolyte at a concentration in the range of about 0.001 to about 12 M.

6. The electrochemical cell of claim 5, wherein the additional metal salt is selected from the group consisting of Mg(TFSI)$_2$, Al(TFSI)$_3$, Ca(TFSI)$_2$, Zn(TFSI)$_2$, and a combination of two or more thereof.

7. The electrochemical cell of claim 5, wherein the non-aqueous organic solvent of the electrolyte is selected from the group consisting of (a) an ether selected from the group consisting of glyme, diglyme, triglyme, and tetraglyme; (b) an organic carbonate other than ethylene carbonate; and (c) a combination of (a) and (b).

8. The electrochemical cell of claim 5, wherein the non-aqueous organic solvent of the electrolyte is triglyme.

9. The electrochemical cell of claim 5, wherein the non-aqueous organic solvent of the electrolyte is one or more carbonate esters selected from the group consisting of propylene carbonate, dimethyl carbonate, diethyl carbonate, and ethylmethyl carbonate.

10. The electrochemical cell of claim 5, wherein the lithium salt of the electrolyte is LiPF$_6$.

11. The electrochemical cell of claim 5, wherein the silicon of the second electrode is selected from the group consisting of silicon particles and a silicon film.

12. The electrochemical cell of claim 5, wherein the second electrode is graphite-free.

13. The electrochemical cell of claim 5, wherein the second electrode comprises silicon and a tetrel element, a pnictogen element, or a combination of a tetrel element and a pnictogen element.

14. The electrochemical cell of claim 5, wherein the second electrode comprises silicon and one or more carbon material.

15. The electrochemical cell of claim 5, wherein the first electrode comprises a cathode active material selected from the group consisting of a layered lithium metal oxide, a layered lithium aluminum metal oxide, a lithium and manganese rich metal oxide, a spinel lithium metal oxide; a structurally integrated 'layered-layered' (LL) lithium metal oxide; a structurally integrated 'layered-spinel' (LS) lithium metal oxide, and a combination of two or more thereof.

16. A battery comprising a plurality of electrochemical cells of claim 5 electrically connected together in series, in parallel, or in both series and parallel.

* * * * *

UNITED STATES PATENT AND TRADEMARK OFFICE
CERTIFICATE OF CORRECTION

PATENT NO. : 11,145,905 B2
APPLICATION NO. : 16/375431
DATED : October 12, 2021
INVENTOR(S) : John T. Vaughey et al.

It is certified that error appears in the above-identified patent and that said Letters Patent is hereby corrected as shown below:

In the Claims

Claim 1, Column 26, Line 25, delete "comprising".
    Line 51, delete "dicvanamide" and insert --dicyanamide--.
    Line 59, delete "bisftrifluoromethanesulfo-" and insert --bis(trifluoromethanesulfo-.--.
    Line 61, delete "2-trifluoromethvl-4,5-" and insert --2-trifluoromethyl-4,5--.
    Line 62, delete "dicvanoimidazolate" and insert --dicyanoimidazolate.--.
    Line 64, delete "(LiClO4)" and insert --(LiClO$_4$)--.
    Line 66, delete "(LiBFA)" and insert --(LiBF$_4^-$)--.

Column 27, Line 1, delete "bistfluorosulfonyl)" and insert --bis(fluorosulfonyl)--.
    Line 2, delete "bistpentafluoroethylsulfonyl)" and insert
    --bis(pentafluoroethylsulfonyl)--.

Claim 3, Column 27, Line 18, delete "comprises".

Claim 5, Column 27, Line 34, delete "an".
    Line 51, delete "(BFF)" and insert --BF$_4^-$--.
    Line 54, delete "(B(CN)$_4$-" and insert --(B(CN)$_4^-$)--.
    Line 55, delete "dicvanamide" and insert --dicyanamide--.
    Line 56, delete "Me$_2$SO$_4^-$" and insert --Me$_2$PO$_4^-$--.
    Line 59, delete "YX$_{12}^-$" and insert --CB$_{11}$H$_{12}^-$--.
    Line 64, delete "bisftrifluoromethanesulfo-" and insert --bis(trifluoromethanesulfo--.
    Line 65, delete "2-trifluoromethvl-4,5-" and insert --2-trifluoromethyl-4,5- --.
    Line 66, delete "dicvanoimidazolate" and insert --dicyanoimidazolate--.

Column 28, Line 4, delete "(LiBFA)" and insert --(LiBF$_4$)--.
    Line 6, delete "bistfluorosulfonyl)imidate" and insert --bis(fluorosulfonyl)imidate--.
    Line 7, delete "bistpentafluoroethylsulfonyl)imidate" and insert
    --bis(pentafluoroethylsulfonyl)imidate--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*